US012541156B2

(12) United States Patent
Kawabata et al.

(10) Patent No.: US 12,541,156 B2
(45) Date of Patent: Feb. 3, 2026

(54) IMAGE FORMING APPARATUS

(71) Applicant: FUJIFILM Business Innovation Corp., Tokyo (JP)

(72) Inventors: Yukimi Kawabata, Kanagawa (JP); Kenta Yamakoshi, Kanagawa (JP); Hiroyuki Miura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 468 days.

(21) Appl. No.: 18/311,247

(22) Filed: May 3, 2023

(65) Prior Publication Data

US 2024/0077808 A1 Mar. 7, 2024

(30) Foreign Application Priority Data

Aug. 16, 2022 (JP) ................................ 2022-129666

(51) Int. Cl.

| | |
|---|---|
| ***G03G 15/00*** | (2006.01) |
| ***G03G 5/043*** | (2006.01) |
| ***G03G 5/06*** | (2006.01) |
| ***G03G 15/02*** | (2006.01) |

(52) U.S. Cl.

CPC ......... *G03G 5/043* (2013.01); *G03G 5/06142* (2020.05); *G03G 5/061446* (2020.05); *G03G 5/0672* (2013.01); *G03G 15/0233* (2013.01)

(58) Field of Classification Search

CPC ............... G03G 5/043; G03G 5/06142; G03G 5/061446; G03G 5/0672; G03G 15/0233

See application file for complete search history.

(56) References Cited

U.S. PATENT DOCUMENTS

2020/0393773 A1* 12/2020 Nishimura ......... G03G 15/0233
2021/0026269 A1* 1/2021 Ishino .................. G03G 5/0546

FOREIGN PATENT DOCUMENTS

JP 6291953 3/2018

* cited by examiner

*Primary Examiner* — Hoang X Ngo
(74) *Attorney, Agent, or Firm* — JCIPRNET

(57) ABSTRACT

A contact charging type image forming apparatus, to which only a direct current voltage is applied, includes an electrophotographic photoreceptor that includes a conductive base material A and a photosensitive layer provided on the conductive base material A, and a charging member that includes a conductive base material B and an elastic layer provided on the conductive base material B, in which in a case where a dielectric film thickness of the electrophotographic photoreceptor is defined as L, and a resistance component of an impedance of the charging member in a range of 1 Hz or greater and 500 Hz or less, which is measured by an alternating current impedance method, is defined as R, Expression (1) is satisfied.

$$L<-0.75\times\log_e(R)+15.79 \quad \text{Expression(1)}$$

10 Claims, 4 Drawing Sheets

IMAGE FORMING APPARATUS

CROSS-REFERENCE TO RELATED APPLICATIONS

This application is based on and claims priority under 35 USC 119 from Japanese Patent Application No. 2022-129666 filed Aug. 16, 2022.

BACKGROUND

(i) Technical Field

The present invention relates to an image forming apparatus.

(ii) Related Art

In recent years, electrophotographic image formation has been widely used in image forming apparatuses such as copying machines and laser printers.

In an electrophotographic image forming apparatus, first, a surface of an electrophotographic photoreceptor is charged by a charging device, an electrostatic latent image is formed by laser light or the like obtained by modulating an image signal, the electrostatic latent image on the surface of the electrophotographic photoreceptor is developed and visualized with a charged toner, and thus a toner image is formed. Further, a reproduced image is obtained by electrostatically transferring the toner image to a recording material such as recording paper directly or via an intermediate transfer member and fixing the toner image to the recording material.

For example, JP6291953B discloses a charging member including a conductive support, a conductive elastic layer disposed on the conductive support, and a surface layer disposed on the conductive elastic layer, in which a high-frequency resistance component in a range of 100 Hz or greater and less than 10 kHz is $1.20\times10^4\Omega$ or greater and $2.99\times10^4\Omega$ or less and a low-frequency resistance component in a range of 0.1 Hz or greater and 10 Hz or less is $2.48\times10^4\ \Omega$ or greater and $3.60\times10^4\Omega$ or less, measured by an alternating current impedance method in a range of 1 MHz to 1 mHz.

SUMMARY

Aspects of non-limiting embodiments of the present disclosure relate to an image forming apparatus, to which only a direct current voltage is applied (hereinafter, also referred to as "DC contact charging type), in which a property of suppressing occurrence of color streaks in an image to be obtained is excellent as compared with a case where Expression (1) is not satisfied in a case where a dielectric film thickness of an electrophotographic photoreceptor is defined as L, and a resistance component of an impedance of the charging member in a range of 1 Hz or greater and 500 Hz or less, which is measured by an alternating current impedance method, is defined as R.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

The following invention is provided in order to achieve the above-described object.

According to an aspect of the present disclosure, there is provided a contact charging type image forming apparatus, to which only a direct current voltage is applied, the apparatus including: an electrophotographic photoreceptor that includes a conductive base material A and a photosensitive layer provided on the conductive base material A; and a charging member that includes a conductive base material B and an elastic layer provided on the conductive base material B, in which in a case where a dielectric film thickness of the electrophotographic photoreceptor is defined as L, and a resistance component of an impedance of the charging member in a range of 1 Hz or greater and 500 Hz or less, which is measured by an alternating current impedance method, is defined as R, Expression (1) is satisfied.

$$L<-0.75\times\log_e(R)+15.79 \quad \text{Expression (1)}$$

BRIEF DESCRIPTION OF THE DRAWINGS

Exemplary embodiment(s) of the present invention will be described in detail based on the following figures, wherein.

DETAILED DESCRIPTION

Figure 1:
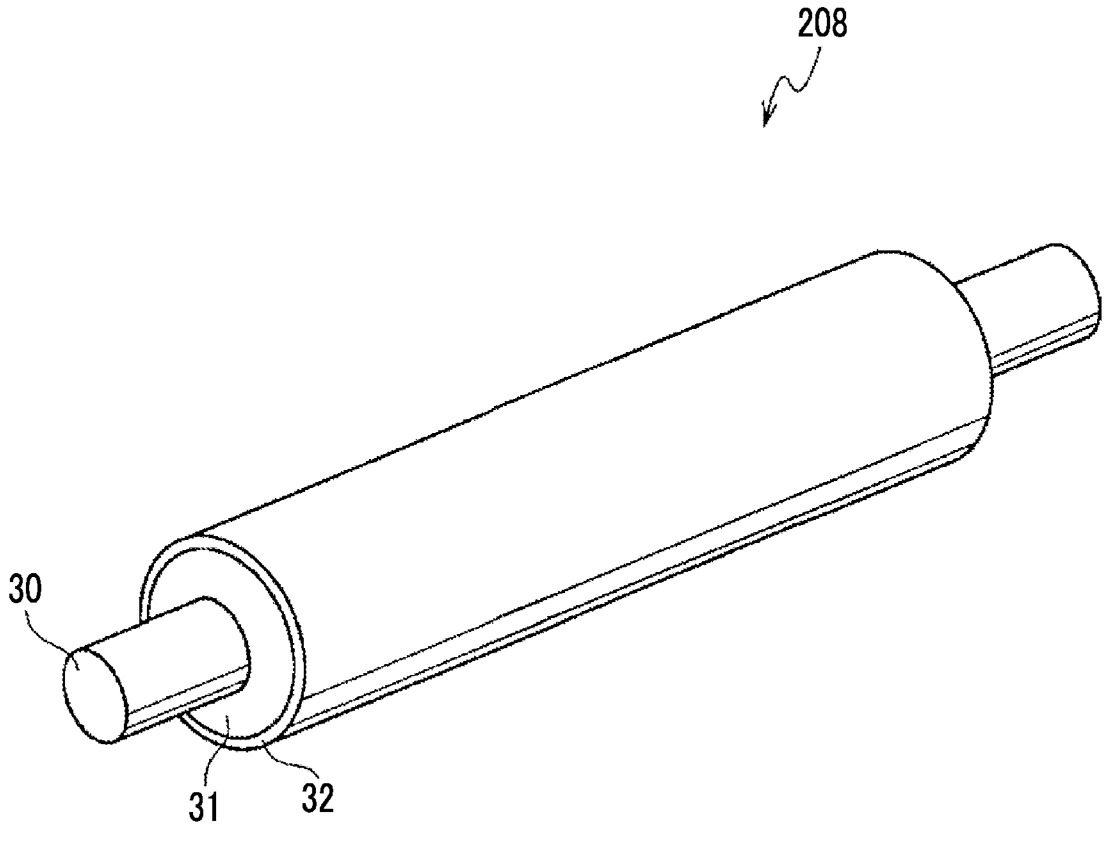
FIG. 1 is a schematic view showing an example of a configuration of a charging member used in an image forming apparatus according to the present exemplary embodiment.

Hereinafter, exemplary embodiments that are examples of the present invention will be described.

In a numerical range described in a stepwise manner, an upper limit or a lower limit described in a certain numerical range may be replaced with an upper limit or a lower limit in another numerical range described in a stepwise manner. Further, in a numerical range, an upper limit or a lower limit described in a certain numerical range may be replaced with a value shown in an example.

In a case where a plurality of kinds of substances corresponding to each component in a composition are present, the amount of each component in the composition indicates the total amount of the plurality of kinds of substances present in the composition unless otherwise specified.

In the present disclosure, the meaning of the term "step" includes not only an independent step but also a step whose intended purpose is achieved even in a case where the step is not clearly distinguished from other steps.

Image Forming Apparatus

An image forming apparatus according to the present exemplary embodiment is a contact charging type image forming apparatus, to which only a direct current voltage is applied, including an electrophotographic photoreceptor that includes a conductive base material A and a photosensitive layer provided on the conductive base material A, and a charging member that includes a conductive base material B and an elastic layer provided on the conductive base material B, in which in a case where a dielectric film thickness of the electrophotographic photoreceptor is defined as L, and a resistance component of an impedance of the charging member in a range of 1 Hz or greater and 500 Hz or less, which is measured by an alternating current impedance method, is defined as R, Expression (1) is satisfied.

$$L<-0.75\times\log_e(R)+15.79 \quad \text{Expression (1)}$$

In an image forming apparatus of the related art, color streaks may occur in an image to be obtained due to a combination of a charging member and an electrophotographic photoreceptor.

In the image forming apparatus according to the present exemplary embodiment, since the dielectric film thickness L of the electrophotographic photoreceptor and the resistance component R of the charging member satisfy Expression (1), a variation in the intensity of discharge occurring immediately before the contact between the electrophotographic photoreceptor and the charging member is suppressed, a pulse generation cycle of the discharge after the electrophotographic photoreceptor and the charging member come into contact with each other and charged is stabilized at an appropriate length, and thus the occurrence of color streaks is suppressed.

Further, the image forming apparatus according to the present exemplary embodiment has not only an excellent property of suppressing occurrence of color streaks in a normal temperature and normal humidity environment (20° C. and 50% RH) but also an excellent property of suppressing occurrence of color streaks in a high-temperature and high-humidity environment (28° C. and 85% RH).

Expression (1): Relationship Between Dielectric Film Thickness of Electrophotographic Photoreceptor and Resistance Component of Charging Member The image forming apparatus according to the present exemplary embodiment satisfies Expression (1) in a case where the dielectric film thickness of the electrophotographic photoreceptor is defined as L and the resistance component of the charging member in a range of 1 Hz or greater and 500 Hz or less is defined as R.

$$L<-0.75\times\log_e(R)+15.79 \quad \text{Expression(1)}$$

The present inventors have examined in detail the relationship between the occurrence of color streaks and the contact between the electrophotographic photoreceptor and the charging member and thus have found that the relationship between the dielectric film thickness L of the electrophotographic photoreceptor and the resistance component R of an impedance of the charging member in a range of 1 Hz or greater and 500 Hz or less, measured by an alternating current impedance method is a substantial factor. Further, the present inventors have examined the relationship between the values of the dielectric film thickness L and the resistance component R and the occurrence of color streaks and thus have found a boundary where the amount of color streaks is not practically appropriate by the least squares method using Expression (1) by two-dimensionally plotting the value of the dielectric film thickness L and the value of the common logarithm of the resistance component R.

Further, from the viewpoint of the property of suppressing occurrence of color streaks, the image forming apparatus according to the present exemplary embodiment satisfies, for example, preferably Expression (2), more preferably Expression (3), and particularly preferably Expression (4).

$$-0.75\times\log_e(R)+13.29<L<-0.75\times\log_e(R)+15.79 \quad \text{Expression (2)}$$

$$-0.75\times\log_e(R)+13.54<L<-0.75\times\log_e(R)+15.77 \quad \text{Expression (3)}$$

$$-0.75\times\log_e(R)+13.79<L<-0.75\times\log_e(R)+15.74 \quad \text{Expression (4)}$$

Further, from the viewpoint of the property of suppressing occurrence of color streaks, a difference between the value of L and the value of the right side ($-0.75\times\log_e(R)+15.79$) of Expression (1) is, for example, preferably greater than 0 and less than 2, more preferably greater than 0.2 and less than 1.5, and particularly preferably greater than 0.5 and less than 1.0.

Further, from the viewpoint of the property of suppressing occurrence of color streaks, the value of L is, for example, preferably 8.00 μm or less, more preferably 7.00 μm or less, and particularly preferably 6.50 μm or less.

Further, from the viewpoint of the property of suppressing occurrence of color streaks, the value of L is, for example, preferably 3.00 μm or greater, more preferably 3.50 μm or greater, and particularly preferably 3.70 μm or greater.

A method of measuring the dielectric film thickness L of the electrophotographic photoreceptor according to the present exemplary embodiment is as follows.

A capacitance C of the photosensitive layer per unit area in the electrophotographic photoreceptor is represented by the parallel-plate capacitor formula C=ε/d (ε: dielectric constant and d: film thickness of photosensitive layer).

$$\text{Dielectric Film Thickness } L=d/\varepsilon=1/C$$

Charge transport layer (CTL) actual film thickness: dCT, protective layer (OCL) actual film thickness: dOC, CTL dielectric constant: εCT, OCL dielectric constant: εOC Therefore, the reciprocal of the combined capacity of the charge transport layer and the protective layer per unit area is "1/C=(dOC/εOC)+(dCT/εCT)=L" (synthetic dielectric film thickness of the charge transport layer and the protective layer) by a method of acquiring the combined capacity of a typical capacitor.

The dielectric film thickness L is acquired by measuring the relationship (Q-V characteristic) between an electric charge (Q(C)) and an electric potential (V(V)) of the electrophotographic photoreceptor per unit area under a condition of a normal temperature and normal humidity environment or a high-temperature and high-humidity environment.

Based on "Capacitor formula: Q=C·V",

"V/Q (Q–V characteristic inclination)=1/C=(dOC/εOC)+(dCT/εCT)=L" is satisfied.

Further, the dielectric film thickness L in the present exemplary embodiment is in units of μm unless otherwise specified.

A method of adjusting the dielectric film thickness L of the electrophotographic photoreceptor is not particularly limited, and the thickness is adjusted by, for example, the composition and the thickness of the charge transport layer in the photosensitive layer and the presence or absence, the composition, and the thickness of the protective layer.

The resistance component R of the charging member is a resistance component of an impedance in a range of 1 Hz or greater and 500 Hz or less, measured by an alternating current impedance method.

From the viewpoint of the property of suppressing occurrence of color streaks, the resistance component R is, for example, preferably $1.0\times10^4\Omega$ or greater and $2.0\times10^6\Omega$ or less, more preferably $2.0\times10^4\Omega$ or greater and $2.0\times10^6\Omega$ or less, and particularly preferably $5.0\times10^5\Omega$ or greater and $2.0\times10^6\Omega$ or less.

A method of measuring the resistance component R of an impedance of the charging member according to the present exemplary embodiment in a range of 1 Hz or greater and 500 Hz or less, measured by an alternating current impedance method is as follows.

The resistance component R is measured by using SI 1260 impedance/gain phase analyzer (manufactured by Toyo corporation) as a power supply and an ammeter, and a 1296 dielectric interface (manufactured by Toyo Corporation) as a current amplifier.

A 1Vp-p alternating current voltage is applied from a high frequency side in a frequency range of 500 Hz to 1 Hz using a conductive base material in a sample (charging member) for measuring the impedance as a cathode and a charging member having a surface wound by an aluminum plate with a width of 1.5 cm by one round as an anode, and the resistance component R of the impedance of each sample by an alternating current impedance method is measured in a normal temperature and normal humidity environment (20° C. and 50% RH) or a high-temperature and high-humidity environment (28° C. and 85% RH).

A method of adjusting the resistance component R of the charging member is not particularly limited, and the value of the resistance component R is adjusted by, for example, the composition and the thickness of the elastic layer of the charging member, the presence or absence, the composition, and the thickness of the surface layer, and the surface roughness of the charging member.

Further, the value of the resistance component R is also adjusted by, for example, the kind and the compositional ratio of the solvent in a coating solution formed by coating the surface layer, the amount of the solid content, and the kind and the amount of the resin.

Charging Member

The image forming apparatus according to the present exemplary embodiment includes a charging member having a conductive base material B and an elastic layer provided on the conductive base material B.

Further, the charging member is a contact charging type charging member to which only a direct current voltage is applied.

The shape of the charging member according to the present exemplary embodiment is not particularly limited, and examples thereof include a roll shape, a brush shape, a belt (tube) shape, and a blade shape. Among these, for example, the roll-shaped charging member described in the present exemplary embodiment is preferable, that is, the form of a so-called charging member is preferable. Hereinafter, a roll-shaped charging member (hereinafter, also simply referred to as "charging member") will be chiefly described as an example of the charging member according to the present exemplary embodiment.

In the present specification, the conductivity denotes that the volume resistivity at 20° C. is less than 1×10Ω cm, and the semiconductivity denotes that the volume resistivity at 20° C. is 1×10Ω cm or greater and $1\times10^{10}$Ω cm or less. Further, the volume resistivity in the present specification is a value measured by a volume resistance meter MODEL 152-1 (manufactured by TREK, Inc.) or the like.

FIG. 1 shows an example of the configuration of the charging member according to the present exemplary embodiment. The charging member shown in FIG. 1 is a charging member 208 including a cylindrical or columnar rod-shaped member (shaft) 30 as the conductive base material B, an elastic layer 31 provided on the outer peripheral surface of the shaft 30, and a surface layer 32 provided on the outer peripheral surface of the elastic layer 31. Further, the shaft 30 and the elastic layer 31 adhere to each other with an adhesive layer (not shown).

Conductive Base Material B

The charging member according to the present exemplary embodiment includes the conductive base material B.

The conductive base material B in the present exemplary embodiment functions as an electrode and a support member of the charging member, and examples of the material thereof include a metal such as iron (free-cutting steel or the like), copper, brass, stainless steel, aluminum, or nickel, or an alloy thereof; iron subjected to a plating treatment with chromium, nickel, or the like; and a conductive material such as a conductive resin.

The conductive base material is a conductive rod-shaped member, and examples thereof include a member obtained by performing a plating treatment on the outer peripheral surface (such as a resin or a ceramic member) and a member in which a conductive agent is dispersed (such as a resin or a ceramic member).

The conductive base material may be a hollow member (cylindrical member) or a non-hollow member.

Elastic Layer

The charging member according to the present exemplary embodiment includes an elastic layer provided on the conductive base material B.

It is preferable that the elastic layer is, for example, disposed in a roll shape on the outer peripheral surface of the conductive base material (shaft).

The elastic layer is configured to include, for example, an elastic material, a conductive agent, and, as necessary, other additives.

Examples of the elastic material include isoprene rubber, chloroprene rubber, epichlorohydrin rubber, butyl rubber, polyurethane, silicone rubber, fluororubber, styrene-butadiene rubber, butadiene rubber, nitrile rubber, ethylene-propylene rubber, epichlorohydrin-ethylene oxide copolymer rubber, epichlorohydrin-ethylene oxide-allyl glycidyl ether copolymer rubber, ethylene-propylene-diene terpolymer rubber (EPDM), acrylonitrile-butadiene copolymer-rubber (NBR), natural rubber, and blended rubber thereof. Among these, for example, polyurethane, silicone rubber, EPDM, epichlorohydrin-ethylene oxide copolymer rubber, epichlorohydrin-ethylene oxide-allyl glycidyl ether copolymer rubber, NBR, and blended rubbers thereof are preferably used. These elastic materials may be foamed or non-foamed.

Examples of the conductive agent include an electronic conductive agent and an ionic conductive agent.

Examples of the electronic conductive agent include powder, for example, carbon black such as ketjen black or acetylene black; thermally decomposed carbon, graphite; various conductive metals such as aluminum, copper, nickel, and stainless steel or alloys thereof; various conductive metal oxides such as tin oxide, indium oxide, titanium oxide, a tin oxide-antimony oxide solid solution, and a tin oxide-indium oxide solid solution; and a substance obtained by performing a conduction treatment on the surface of an insulating material.

Examples of the ionic conductive agent include perchlorates or chlorates of tetraethylammonium and lauryltrimethylammonium; and perchlorates or chlorates of alkali metals and alkaline earth metals such as lithium and magnesium.

The conductive agent may be used alone or in combination of two or more kinds thereof.

Here, specific examples of carbon black include "SPECIAL BLACK 350", "SPECIAL BLACK 100", "SPECIAL BLACK 250", "SPECIAL BLACK 5", "SPECIAL BLACK 4", "SPECIAL BLACK 4A", "SPECIAL BLACK 550", "SPECIAL BLACK 6", "COLOR BLACK FW200", "COLOR BLACK FW2", and, "COLOR BLACK FW2V"

(all manufactured by Degussa-Huels AG), and "MONARCH 1000", "MONARCH 1300", "MONARCH 1400", "MOGUL-L", and "REGAL 400R" (all manufactured by Cabot Corporation).

The average particle diameter of the conductive agent is, for example, preferably 1 nm or greater and 200 nm or less. Further, the average particle diameter is obtained by observing the conductive agent with an electron microscope, measuring the diameters of 100 particles of the conductive agent, and averaging the measured values.

In a case of the electronic conductive agent, the amount of the conductive agent to be added in the elastic layer is not particularly limited, but is preferably 1 part by mass or greater and 30 parts by mass or less and more preferably 15 parts by mass or greater and 25 parts by mass or less with respect to 100 parts by mass of the elastic material.

Further, in a case of the ionic conductive agent, the amount thereof is, for example, preferably 0.1 parts by mass or greater and 5.0 parts by mass or less and more preferably 0.5 parts by mass or greater and 3.0 parts by mass or less with respect to 100 parts by mass of the elastic material.

Examples of other additives to be blended into the elastic layer include materials that can be added to known elastic layers, such as softeners, plasticizers, curing agents, vulcanization agents, vulcanization accelerators, antioxidants, surfactants, coupling agents, and fillers (silica, calcium carbonate, and the like).

In the formation of the elastic layer 31, a mixing method and mixing order of the conductive agent, the elastic material, and other components (components such as a vulcanization agent and a foaming agent added as necessary) constituting the elastic layer 31 are not particularly limited, and examples of a typical method thereof includes a method of mixing all components in advance in a tumbler, a V-blender, or the like, melt-mixing the mixture with an extruder, and extrusion-molding the mixture.

The thickness of the elastic layer is, for example, preferably 1 mm or greater and 10 mm or less and more preferably 2 mm or greater and 5 mm or less.

Further, the volume resistivity of the elastic layer is, for example, preferably $10^3\Omega$ cm or greater and $10^{14}\Omega$ cm or less.

Surface Layer

From the viewpoint of the property of suppressing occurrence of color streaks, it is preferable that the charging member further includes, for example, a surface layer on the elastic layer.

Examples of the surface layer include a layer formed mainly for preventing contamination due to a toner and the like, and the surface layer is formed by dispersing particles in a binder resin.

Examples of the binder resin used for the surface layer include a urethane resin, a polyester resin, a phenol resin, an acrylic resin, an epoxy resin, and a cellulose resin.

Among these, from the viewpoint of the property of suppressing occurrence of color streaks, the binder resin includes, for example, preferably a polyvinyl butyral resin and more preferably a polyamide resin and a polyvinyl butyral resin, and it is particularly preferable that the surface layer has a sea-island structure having a polyamide resin as a sea structure and a polyvinyl butyral resin as an island structure.

Further, from the viewpoints of adjustment of the resistance component R of the impedance and the property of suppressing occurrence of color streaks, the ratio of the content mass of the polyamide resin to the content mass of the polyvinyl butyral resin(polyamide resin:polyvinyl butyral resin) in the surface layer is, for example, preferably in a range of 5:5 to 9.5:0.5, more preferably in a range of 6:4 to 9:1, and particularly preferably in a range of 6.5:3.5 to 8.5:1.5.

The particles contained in the surface layer are used for the purpose of obtaining stabilized charging characteristics by controlling the resistance using a conductive material to reduce the environmental variation in the resistance value of the surface layer and improving the abrasion resistance between photoreceptors by controlling unevenness of the roll surface to reduce the friction coefficient with the photoreceptors. Further, an additive or the like can be used for the purpose of improving the adhesiveness to a lower layer (for example, the elastic layer 31) and controlling dispersion of particles in the binder resin.

As the conductive particles, for example, particles having a particle diameter of 3 μm or less and a volume resistivity of $10^9\Omega$ cm or less are preferable. For example, particles consisting of metal oxides such as tin oxide, titanium oxide, and zinc oxide or alloys thereof, carbon black, or the like can be used.

In particular, the conductive particles contained in the surface layer affect the resistance of the charging member (impedance and the resistance component R of the impedance), and thus the kind and the content of the particles may be selected according to the target resistance. For example, it is preferable 2 parts by mass or greater and 20 parts by mass or less of the conductive particles are blended with respect to 100 parts by mass of the binder resin contained in the surface layer.

Among the examples described above, from the viewpoints of adjustment of an impedance Z and the resistance component R of the impedance and the property of suppressing occurrence of color streaks, it is preferable that the surface layer contains, for example, carbon black as the conductive particles.

Further, from the viewpoints of adjustment of the impedance Z and the resistance component R of the impedance and the property of suppressing occurrence of color streaks, the content of carbon black is, for example, preferably 5% by mass or greater and 20% by mass or less, more preferably 6% by mass or greater and 15 parts by mass or less, and particularly preferably 8% by mass or greater and 13% by mass or less with respect to the total mass of the surface layer.

Fluorine-based or silicone-based particles, alumina, silica, or polyamide-based particles can be used as other particles, and the particle diameter thereof is, for example, preferably 3 μm or greater and 10 μm or less.

Among these, it is preferable that the surface layer contains, for example, polyamide particles as other particles from the viewpoint of the property of suppressing occurrence of color streaks.

Further, from the viewpoints of adjustment of the impedance and the resistance component R of the impedance and the property of suppressing occurrence of color streaks, the content of the polyamide particles is, for example, preferably 2% by mass or greater and 15% by mass or less, more preferably 3% by mass or greater and 10% by mass or less, and particularly preferably 5% by mass or greater and 8% by mass or less with respect to the total mass of the surface layer.

Further, it is preferable that the surface layer of the present exemplary embodiment contains, for example, carbon black and polyamide particles as particles and dimethylsiloxane as an additive from the viewpoint of suppressing occurrence of color streaks.

The surface layer is formed by coating the elastic layer with a coating solution (coating solution for forming a surface layer) containing the binder resin and the particles described above and further containing an additive to be added as necessary.

Examples of a method of coating the layer with the coating solution for forming a surface layer include typical methods such as a roll coating method, a blade coating method, a wire bar coating method, a spray coating method, a dip coating method, a bead coating method, an air knife coating method, and a curtain coating method.

The elastic layer is coated with the coating solution for forming a surface layer and dried to form the surface layer. The drying temperature is, for example, 80° C. or higher and 200° C. or lower.

The thickness of the surface layer is, for example, preferably 5 μm or greater and 20 μm or less and more preferably 7 μm or greater and 13 μm or less.

Further, the volume resistivity of the surface layer is, for example, preferably $1\times10^{3}$ Ω cm or greater and $1\times10^{14}$Ω cm or less.

The formation of the surface layer is not particularly limited, and a known forming method is used. For example, a coating film of a coating solution for forming a surface layer in which the above-described components are added to a solvent is formed, and the coating film is dried and, as necessary, heated.

Examples of the solvent for preparing the coating solution for forming a surface layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of these solvents include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene. For example, a solvent containing at least one or more hydroxyl groups (for example, alcohols) or an ether solvent (for example, tetrahydrofuran) may be used as the solvent.

Among these, from the viewpoints of adjustment of the impedance Z and the resistance component R of the impedance and the property of suppressing occurrence of color streaks, for example, the solvent includes, for, example, preferable two kinds of alcohols, more preferably two kinds of solvents selected from the group consisting of methanol, ethanol, and n-propanol, and particularly preferably methanol and n-propanol.

Further, from the viewpoints of adjustment of the impedance Z and the resistance component R of the impedance and the property of suppressing occurrence of color streaks, the mixing ratio of methanol to n-propanol (methanol:n-propanol) is, for example, preferably in a range of 1:1 to 20:1, more preferably in a range of 6:4 to 10:1, and particularly preferably in a range of 7:3 to 9:1 in terms of the mass ratio.

Further, from the viewpoints of adjustment of the impedance Z and the resistance component R of the impedance and the property of suppressing occurrence of color streaks, the amount of the solid content in the coating solution for forming a surface layer is, for example, preferably in a range of 10% by mass to 30% by mass, more preferably in a range of 16% by mass to 25% by mass, and particularly preferably in a range of 17% by mass to 23% by mass.

Examples of a method of dispersing the particles in a case of preparing the coating solution for forming a surface layer include known methods such as a roll mill, a ball mill, a vibration ball mill, an attritor, a sand mill, a colloid mill, and a paint shaker.

Since the particles are unlikely to be dissolved in an organic solvent, for example, it is preferable that the particles are dispersed in an organic solvent. Examples of a dispersing method include known methods such as a roll mill, a ball mill, a vibration ball mill, an attritor, a sand mill, a colloid mill, and a paint shaker.

Examples of the method of coating the elastic layer with the coating solution for forming a surface layer include typical coating methods such as a blade coating method, a wire bar coating method, a spray coating method, a dip coating method, a bead coating method, an air knife coating method, and a curtain coating method.

Surface Roughness Rz

From the viewpoint of the property of suppressing occurrence of color streaks, the surface roughness Rz of the charging member according to the present exemplary embodiment is, for example, preferably 2 μm or greater and 10 μm or less, more preferably 4 μm or greater and 7 μm or less, and particularly preferably 4.5 μm or greater and 6.5 μm or less. In a case where the surface roughness is in the above-described ranges, since contaminants contained in a developer or the like attached to the surface of the charging member is unlikely to be transported to the charging member and the contaminants are easily removed by a cleaning member or the like for the charging member, the influence of the contaminants is suppressed, a discharge void immediately after the contact portion between the electrophotographic photoreceptor and the charging member is further suppressed, and thus the property of suppressing occurrence of color streaks is more excellent.

In the present exemplary embodiment, the surface roughness Rz (ten-point average roughness Rz) is a surface roughness measured in accordance with JIS B 0601: 1994. The surface roughness Rz is measured by using a contact-type surface roughness measuring device (SURFCOM 570A, manufactured by Tokyo Seimitsu Co., Ltd.) and a contact needle with a diamond tip (5 μmR, 90° cone) in an environment of a temperature of 23° C. and a relative humidity of 55%. The measurement distance is 2.5 mm, and the measurement site is a site from a position spaced from a terminal of a discharge region by 5 mm to a position spaced by 7.5 mm. In a case where the charging member has a roll shape, a belt shape, or a tube shape, measurement is performed at four sites in 90-degree increments in a circumferential direction of the charging member and at both ends of the discharge region, and an average value of the measured values at a total of eight sites is calculated. In a case where the charging member has a blade shape, measurement is performed at both ends of the discharge region at the center of the blade in the width direction (direction orthogonal to the axial direction), and an average value of the measured values at a total of two sites is calculated.

Electrophotographic Photoreceptor

An image forming apparatus according to the present exemplary embodiment includes the electrophotographic photoreceptor including the conductive base material A and the photosensitive layer provided on the conductive base material A.

Conductive Base Material A

Examples of the conductive base material A include metal plates containing metals (such as aluminum, copper, zinc, chromium, nickel, molybdenum, vanadium, indium, gold, and platinum) or alloys (such as stainless steel), metal drums, metal belts, and the like. Further, examples of the conductive base material include paper, a resin film, a belt, and the like obtained by being coated, vapor-deposited, or laminated with a conductive compound (such as a conductive polymer or indium oxide), a metal (such as aluminum, palladium, or gold) or an alloy.

Further, the materials described in the section of the conductive base material B can also be used as the conductive base material A.

Undercoat Layer

The electrophotographic photoreceptor may include an undercoat layer between the conductive base material A and the photosensitive layer.

The undercoat layer is, for example, a layer containing inorganic particles and a binder resin.

Examples of the inorganic particles include inorganic particles having a powder resistance (volume resistivity) of $10^2 \Omega$ cm or greater and $10^{11} \Omega$ cm or less.

Among these, as the inorganic particles having the above-described resistance value, for example, metal oxide particles such as tin oxide particles, titanium oxide particles, zinc oxide particles, and zirconium oxide particles may be used, and zinc oxide particles are particularly preferable.

The specific surface area of the inorganic particles measured by the BET method may be, for example, 10 $m^2/g$ or greater.

The volume average particle diameter of the inorganic particles may be, for example, 50 nm or greater and 2,000 nm or less (for example, preferably 60 nm or greater and 1000 nm or less).

The content of the inorganic particles is, for example, preferably 10% by mass or greater and 80% by mass or less and more preferably 40% by mass or greater and 80% by mass or less with respect to the amount of the binder resin.

The inorganic particles may be subjected to a surface treatment. As the inorganic particles, inorganic particles subjected to different surface treatments or inorganic particles having different particle diameters may be used in the form of a mixture of two or more kinds thereof.

Examples of the surface treatment agent include a silane coupling agent, a titanate-based coupling agent, an aluminum-based coupling agent, and a surfactant. In particular, for example, a silane coupling agent is preferable, and a silane coupling agent containing an amino group is more preferable.

Examples of the silane coupling agent containing an amino group include 3-aminopropyltriethoxysilane, N-2-(aminoethyl)-3-aminopropyltrimethoxysilane, N-2-(aminoethyl)-3-aminopropylmethyldimethoxysilane, and N,N-bis (2-hydroxyethyl)-3-aminopropyltriethoxysilane, but are not limited thereto.

The silane coupling agent may be used in the form of a mixture of two or more kinds thereof. For example, a silane coupling agent containing an amino group and another silane coupling agent may be used in combination. Examples of other silane coupling agents include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane, but are not limited thereto.

The surface treatment method using a surface treatment agent may be any method as long as the method is a known method, and any of a dry method or a wet method may be used.

The treatment amount-of the surface treatment agent is, for example, preferably 0.5% by mass or greater and 10% by mass or less with respect to the amount of the inorganic particles.

Here, the undercoat layer may contain, for example, an electron-accepting compound (acceptor compound) together with the inorganic particles from the viewpoint of enhancing the long-term stability of the electrical properties and the carrier blocking properties.

Examples of the electron-accepting compound include electron-transporting substances, for example, a quinone-based compound such as chloranil or bromanil; a tetracyanoquinodimethane-based compound; a fluorenone compound such as 2,4,7-trinitrofluorenone or 2,4,5,7-tetranitro-9-fluorenone; an oxadiazole-based compound such as 2-(4-biphenyl)-5-(4-t-butylphenyl)-1,3,4-oxadiazole, 2,5-bis(4-naphthyl)-1,3,4-oxadiazole, or 2,5-bis(4-diethylaminophenyl)-1,3,4-oxadiazole; a xanthone-based compound; a thiophene compound; and a diphenoquinone compound such as 3,3',5,5'-tetra-t-butyldiphenoquinone.

In particular, as the electron-accepting compound, for example, a compound having an anthraquinone structure is preferable. As the compound having an anthraquinone structure, for example, a hydroxyanthraquinone compound, an aminoanthraquinone compound, or an aminohydroxyanthraquinone compound is preferable, and specifically, for example, anthraquinone, alizarin, quinizarin, anthrarufin, or purpurin is preferable.

The electron-accepting compound may be contained in the undercoat layer in a state of being dispersed with inorganic particles or in a state of being attached to the surface of each inorganic particle.

Examples of the method of attaching the electron-accepting compound to the surface of the inorganic particle include a dry method and a wet method.

The dry method is, for example, a method, of attaching the electron-accepting compound to the surface of each inorganic particle by adding the electron-accepting compound dropwise to inorganic particles directly or by dissolving the electron-accepting compound in an organic solvent while stirring the inorganic particles with a mixer having a large shearing force and spraying the mixture together with dry air or nitrogen gas. The electron-accepting compound may be added dropwise or sprayed, for example, at a temperature lower than or equal to the boiling point of the solvent. After the dropwise addition or the spraying of the electron-accepting compound, the compound may be further baked at 100° C. or higher. The baking is not particularly limited as long as the temperature and the time are adjusted such that the electrophotographic characteristics can be obtained.

The wet method is, for example, a method of attaching the electron-accepting compound to the surface of inorganic particles by adding the electron-accepting compound to inorganic particles while dispersing the inorganic particles in a solvent using a stirrer, ultrasonic waves, a sand mill, an attritor, or a ball mill, stirring or dispersing the mixture, and removing the solvent. The solvent removing method is carried out by, for example, filtration or distillation so that the solvent is distilled off. After removal of the solvent, the mixture may be further baked at 100° C. or higher. The baking is not particularly limited as long as the temperature and the time are adjusted such that the electrophotographic characteristics can be obtained. In the wet method, the moisture contained in the inorganic particles may be removed before the electron-accepting compound is added, and examples thereof include a method of removing the moisture while stirring and heating the moisture in a solvent and a method of removing the moisture by azeotropically boiling the moisture with a solvent.

Further, the electron-accepting compound may be attached to the surface before or after the inorganic particles are subjected to a surface treatment with a surface treatment agent or simultaneously with the surface treatment performed on the inorganic particles with a surface treatment agent.

The content of the electron-accepting compound may be, for example, 0.01% by mass or greater and 20% by mass or less and preferably 0.01% by mass or greater and 10% by mass or less with respect to the amount of the inorganic particles.

Examples of the binder resin used for the undercoat layer include known polymer compounds such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, and an epoxy resin; a zirconium chelate compound; a titanium chelate compound; an aluminum chelate compound; a titanium alkoxide compound; an organic titanium compound; and known materials such as a silane coupling agent.

Examples of the binder resin used for the undercoat layer include a charge-transporting resin containing a charge-transporting group, and a conductive resin (such as polyaniline).

Among these, as the binder resin used for the undercoat layer, for example, a resin insoluble in a coating solvent of the upper layer is preferable, and a resin obtained by reaction between a curing agent and at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin is particularly preferable.

In a case where these binder resins are used in combination of two or more kinds thereof, the mixing ratio thereof is set as necessary.

The undercoat layer may contain various additives for improving the electrical properties, the environmental stability, and the image quality.

Examples of the additives include known materials, for example, an electron-transporting pigment such as a polycyclic condensed pigment or an azo-based pigment, a zirconium chelate compound, a titanium chelate compound, an aluminum chelate compound, a titanium alkoxide compound, an organic titanium compound, and a silane coupling agent. The silane coupling agent is used for a surface treatment of the inorganic particles as described above, but may be further added to the undercoat layer as an additive.

Examples of the silane coupling agent serving as an additive include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isostearate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or in the form of a mixture or a polycondensate of a plurality of compounds.

The undercoat layer may have, for example, a Vickers hardness of 35 or greater.

The surface roughness (ten-point average roughness) of the undercoat layer may be adjusted, for example, to ½ from 1/(4n) (n represents a refractive index of an upper layer) of a laser wavelength λ for exposure to be used to suppress moire fringes.

Resin particles or the like may be added to the undercoat layer to adjust the surface roughness. Examples of the resin particles include silicone resin particles and crosslinked polymethyl methacrylate resin particles. Further, the surface of the undercoat layer may be polished to adjust the surface roughness. Examples of the polishing method include buff polishing, a sandblast treatment, wet honing, and a grinding treatment.

The formation of the undercoat layer is not particularly limited, and a known forming method is used. For example, a coating film of a coating solution for forming an undercoat layer in which the above-described components are added to a solvent is formed, and the coating film is dried and, as necessary, heated.

Examples of the solvent for preparing the coating solution for forming an undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of these solvents include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles in a case of preparing the coating solution for forming an undercoat layer include known methods such as a roll mill, a ball mill, a vibration ball mill, an attritor, a sand mill, a colloid mill, and a paint shaker.

Examples of the method of coating the conductive base material with the coating solution for forming an undercoat layer include typical coating methods such as a blade coating method, a wire bar coating method, a spray coating method, a dip coating method, a bead coating method, an air knife coating method, and a curtain coating method.

The film thickness of the undercoat layer is set to, for example, preferably 15 μm or greater and more preferably in a range of 20 μm or greater and 50 μm or less.

Interlayer

Although not shown in the figures, an interlayer may be further provided between the undercoat layer and the photosensitive layer.

The interlayer is, for example, a layer containing a resin. Examples of the resin used for the interlayer include a polymer compound, for example, an acetal resin (such as polyvinyl butyral), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, or a melamine resin.

The interlayer may be a layer containing an organometallic compound. Examples of the organometallic compound used for the interlayer include an organometallic compound containing metal atoms such as zirconium, titanium, aluminum, manganese, and silicon.

The compounds used for the interlayer may be used alone or in the form of a mixture or a polycondensate of a plurality of compounds.

Among these, it is preferable that the interlayer is, for example, a layer containing an organometallic compound having a zirconium atom or a silicon atom.

The formation of the interlayer is not particularly limited, and a known forming method is used. For example, a coating film of a coating solution for forming an interlayer in which the above-described components are added to a solvent is formed, and the coating film is dried and, as necessary, heated.

Examples of the coating method of forming the interlayer include typical coating methods such as a dip coating method, a push-up coating method, a wire bar coating method, a spray coating method, a blade coating method, an air knife coating method, and a curtain coating method.

The film thickness of the interlayer is set to be, for example, preferably in a range of 0.1 μm or greater and 3 μm or less. Further, the interlayer may be used as the undercoat layer.

Charge Generation Layer

The charge generation layer is, for example, a layer containing a charge generation material and a binder resin. Further, the charge generation layer may be a deposition layer of the charge generation material. The deposition layer of the charge generation material is preferable in a case where an incoherent light source, for example, a light emitting diode (LED) or an organic electroluminescence (EL) image array is used.

Examples of the charge generation material include an azo pigment such as bisazo or trisazo; a fused ring aromatic pigment such as dibromoanthanthrone; a perylene pigment; a pyrrolopyrrole pigment; a phthalocyanine pigment; zinc oxide; and trigonal selenium.

Among these, for example, a metal phthalocyanine pigment or a metal-free phthalocyanine pigment is preferably used as the charge generation material in order to deal with laser exposure in a near infrared region. Specifically, for example, hydroxygallium phthalocyanine; chlorogallium phthalocyanine; dichloro-tin phthalocyanine; and titanyl phthalocyanine are more preferable.

On the other hand, for example, a fused ring aromatic pigment such as dibromoanthanthrone; a thioindigo-based pigment; a porphyrazine compound; zinc oxide; trigonal selenium; or a bisazo pigment is preferable as the charge generation material in order to deal with laser exposure in a near ultraviolet region.

The above-described charge generation material may also be used even in a case where an incoherent light source such as an LED or an organic EL image array having a center wavelength of light emission at 450 nm or greater and 780 nm or less is used, but from the viewpoint of the resolution, the field intensity in the photosensitive layer is increased, and a decrease in charge due to injection of a charge from the substrate, that is, image defects referred to as so-called black spots are likely to occur in a case where a thin film having a thickness of 20 μm or less is used as the photosensitive layer. The above-described tendency is evident in a case where a p-type semiconductor such-as trigonal selenium or a phthalocyanine pigment is used as the charge generation material that is likely to generate a dark current.

On the other hand, in a case where an n-type semiconductor such as a fused ring aromatic pigment, a perylene pigment, or an azo pigment is used as the charge generation material, a dark current is unlikely to be generated, and image defects referred to as black spots can be suppressed even in a case where a thin film is used as the photosensitive layer.

Further, the n-type is determined by the polarity of the flowing photocurrent using a typically used time-of-flight method, and a material in which electrons more easily flow as carriers than positive holes is determined as the n-type.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (a polycondensate of bisphenols and aromatic divalent carboxylic acid), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, and a polyvinylpyrrolidone resin. Here, the term "insulating" denotes that the volume resistivity is $10^{13}\Omega$ cm or greater.

These binder resins may be used alone or in the form of a mixture of two or more kinds thereof.

Further, the blending ratio between the charge generation material and the binder resin is, for example, preferably in a range of 10:1 to 1:10 in terms of the mass ratio.

The charge generation layer may also contain other known additives.

The formation of the charge generation layer is not particularly limited, and a known forming method is used. For example, a coating film of a coating solution for forming a charge generation layer in which the above-described components are added to a solvent is formed, and the coating film is dried and, as necessary, heated. Further, the charge generation layer may be formed by vapor deposition of the charge generation material. The formation of the charge generation layer by vapor deposition is, for example, particularly appropriate in a case where a fused ring aromatic pigment or a perylene pigment is used as the charge generation material.

Examples of the solvent for preparing the coating solution for forming a charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in the form of a mixture of two or more kinds thereof.

As a method of dispersing particles (for example, the charge generation material) in the coating solution for forming a charge generation layer, for example, a media disperser such as a ball mill, a vibration ball mill, an attritor, a sand mill, or a horizontal sand mill, or a medialess disperser such as a stirrer, an ultrasonic disperser, a roll mill, or a high-pressure homogenizer is used. Examples of the high-pressure homogenizer include a collision type homogenizer in which a dispersion liquid is dispersed by a liquid-liquid collision or a liquid-wall collision in a high-pressure state, and a penetration type homogenizer in which a dispersion liquid is dispersed by penetrating the liquid through a micro-flow path in a high-pressure state.

During the dispersion, it is effective to set the average particle diameter of the charge generation material in the coating solution for forming a charge generation layer to 0.5 μm or less, for example, preferably 0.3 μm or less, and more preferably 0.15 μm or less.

Examples of the method of coating the undercoat layer (or the interlayer) with the coating solution for forming a charge generation layer include typical methods such as a blade coating method, a wire bar coating method, a spray coating method, a dip coating method, a bead coating method, an air knife coating method, and a curtain coating method.

The film thickness of the charge generation layer is set to be, for example, in a range of preferably 0.1 μm or greater and 5.0 μm or less and more preferably in a range of 0.2 μm or greater and 2.0 μm or less.

Charge Transport Layer

The charge transport layer is, for example, a layer containing a charge transport material and a binder resin. The charge transport layer may be a layer containing a polymer charge transport material.

Examples of the charge transport material include a quinone-based compound such as p-benzoquinone, chloranil, bromanil, or anthraquinone; a tetracyanoquinodimethane-based compound; a fluorenone compound such as 2,4,7-trinitrofluorenone; a xanthone-based compound; a benzophenone-based compound; a cyanovinyl-based compound; and an electron-transporting compound such as an ethylene-based compound. Examples of the charge transport material include a positive hole-transporting compound such as a triarylamine-based compound, a benzidine-based compound, an arylalkane-based compound, an aryl-substituted ethylene-based compound, a stilbene-based compound, an anthracene-based compound, or a hydrazone-based compound. These charge transport materials may be used alone or in combination of two or more kinds thereof, but are not limited thereto.

From the viewpoint of the charge mobility, for example, a triarylamine derivative represented by Structural Formula (a-1) or a benzidine derivative represented by Structural Formula (a-2) is preferable as the charge transport material.

(a-1)

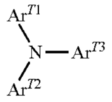

In Structural Formula (a-1), $Ar^{T1}$, $Ar^{T2}$, and $Ar^{T3}$ each independently represent a substituted or unsubstituted aryl group, $-C_6H_4-C(R^{T4})=C(R^{T5})(R^{T6})$, or $-C_6H_4-CH=CH-CH=C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

(a-2)

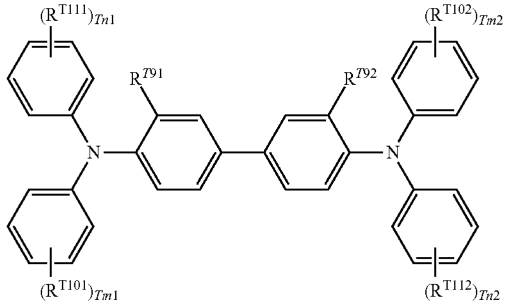

In Structural Formula (a-2), $R^{T91}$ and $R^{T92}$ each independently represent a hydrogen atom, a halogen atom, an alkyl group having 1 or more and 5 or less carbon atoms, or an alkoxy group having 1 or more and 5 or less carbon atoms. $R^{T101}$, $R^{T102}$, $R^{T111}$, and $R^{T112}$ each independently represent a halogen atom, an alkyl group having 1 or more and 5 or less carbon atoms, an alkoxy group having 1 or more and 5 or less carbon atoms, a substituted amino group substituted with an alkyl group having 1 or more and 2 or less carbon atoms, a substituted or unsubstituted aryl group, $-C(R^{T12})=C(R^{T13})(R^{T14})$, or $-CH=CH-CH=C(R^{T15})(R^{T16})$, and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or greater and 2 or less.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

Here, among the triarylamine derivative represented by Structural Formula (a-1) and the benzidine derivative represented by Structural Formula (a-2), for example, a triarylamine derivative having "$-C_6H_4-CH=CH-CH=C(R^{T7})(R^{T8})$" and a benzidine derivative having "—CH═CH—CH═C($R^{T15}$)($R^{T16}$)" are particularly preferable from the viewpoint of the charge mobility.

As the polymer charge transport material, known materials having charge transport properties, such as poly-N-vinylcarbazole and polysilane, can be used. Particularly, for example, a polyester-based polymer charge transport material is particularly preferable. Further, the polymer charge transport material may be used alone or in combination of binder resins.

Examples of the binder resin used for the charge transport layer include a polycarbonate resin, a polyester resin, a polyarylate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. Among these, for example, a polycarbonate resin or a polyarylate resin is preferable as the binder resin. These binder resins may be used alone or in combination of two or more kinds thereof.

Further, the blending ratio between the charge transport material and the binder resin is, for example, preferably in a range of 10:1 to 1:5 in terms of the mass ratio.

The charge transport layer may also contain other known additives.

The formation of the charge transport layer is not particularly limited, and a known forming method is used. For example, a coating film of a coating solution for forming a charge transport layer in which the above-described components are added to a solvent is formed, and the coating film is dried and, as necessary, heated.

Examples of the solvent for preparing the coating solution for forming a charge transport layer include typical organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in the form of a mixture of two or more kinds thereof.

Examples of the coating method of coating the charge generation layer with the coating solution for forming a charge transport layer include typical methods such as a blade coating method, a wire bar coating method, a spray coating method, a dip coating method, a bead coating method, an air knife coating method, and a curtain coating method.

The film thickness of the charge transport layer is set to be, for example, preferably in a range of 5 μm or greater and 50 μm or less and more preferably in a range of 10 μm or greater and 30 μm or less.

Protective Layer

A protective layer is provided on the photosensitive layer as necessary. The protective layer is provided, for example, for the purpose of preventing a chemical change in the photosensitive layer during charging and further improving the mechanical strength of the photosensitive layer.

Therefore, for example, a layer formed of a cured film (crosslinked film) may be applied to the protective layer. Examples of these layers include the layers described in the items 1) and 2) below.

1) A layer formed of a cured film of a composition containing a reactive group-containing charge transport material having a reactive group and a charge-transporting skeleton in an identical molecule (that is, a layer containing a polymer or a crosslinked body of the reactive group-containing charge transport material)
2) A layer formed of a cured film of a composition containing a non-reactive charge transport material and a reactive group-containing non-charge transport material containing a reactive group without having a charge-transporting skeleton (that is, a layer containing the non-reactive charge transport material and a polymer or crosslinked body of the reactive group-containing non-charge transport material)

Examples of the reactive group of the reactive group-containing charge transport material include known reactive groups such as a chain polymerizable group, an epoxy group, —OH, —OR [here, R represents an alkyl group], $—NH_2$, —SH, —COOH, and $—SiR^{Q1}_{3-Qn}(OR^{Q2})_{Qn}$ [here, $R^{Q1}$ represents a hydrogen atom, an alkyl group, or a substituted or unsubstituted aryl group, $R^{Q2}$ represents a hydrogen atom, an alkyl group, or a trialkylsilyl group, and Qn represents an integer of 1 to 3].

The chain polymerizable group is not particularly limited as long as the group is a functional group capable of radical polymerization and is, for example, a functional group containing a group having at least a carbon double bond. Specific examples thereof include a vinyl group, a vinyl ether group, a vinyl thioether group, a styryl group (vinylphenyl group), an acryloyl group, a methacryloyl group, and a group containing at least one selected from derivatives thereof. Among these, from the viewpoint that the reactivity is excellent, for example, a vinyl group, a styryl group (vinylphenyl group), an acryloyl group, a methacryloyl group, and a group containing at least one selected from derivatives thereof are preferable as the chain polymerizable group.

The charge-transporting skeleton of the reactive group-containing charge transport material is not particularly limited as long as the skeleton is a known structure in the electrophotographic photoreceptor, and examples thereof include a structure conjugated with a nitrogen atom, which is a skeleton derived from a nitrogen-containing positive hole-transporting compound such as a triarylamine-based compound, a benzidine-based compound, or a hydrazone-based compound. Among these, for example, a triarylamine skeleton is preferable.

The reactive group-containing charge transport material having the reactive group and the charge-transporting skeleton, the non-reactive charge transport material, and the reactive group-containing non-charge transport material may be selected from known materials.

The protective layer may also contain other known additives.

The formation of the protective layer is not particularly limited, and a known forming method is used. For example, a coating film of a coating solution for forming a protective layer in which the above-described components are added to a solvent is formed, and the coating film is dried and, as necessary, subjected to a curing treatment such as heating.

Examples of the solvent for preparing the coating solution for forming a protective layer include an aromatic solvent such as toluene or xylene; a ketone-based solvent such as methyl ethyl ketone, methyl isobutyl ketone, or cyclohexanone; an ester-based solvent such as ethyl acetate or butyl acetate; an ether-based solvent such as tetrahydrofuran or dioxane; a cellosolve-based solvent such as ethylene glycol monomethyl ether; and an alcohol-based solvent such as isopropyl alcohol or butanol. These solvents are used alone or in the form of a mixture of two or more kinds thereof.

In addition, the coating solution for forming a protective layer may be a solvent-less coating solution.

Examples of the method of coating the photosensitive layer (such as the charge transport layer) with the coating solution for forming a protective layer include typical coating methods such as a dip coating method, a push-up coating method, a wire bar coating method, a spray coating method, a blade coating method, an air knife coating method, and a curtain coating method.

The film thickness of the protective layer is set to be, for example, preferably in a range of 1 μm or greater and 20 μm or less and more preferably in a range of 2 μm or greater and 10 μm or less.

Single Layer Type Photosensitive Layer

The single layer type photosensitive layer (charge generation/charge transport layer) is, for example, a layer containing a charge generation material, a charge transport material, a binder resin, and as necessary, other known additives. Further, these materials are the same as the materials described in the sections of the charge generation layer and the charge transport layer.

Further, the content of the charge generation material in the single layer type photosensitive layer may be, for example, 0.1% by mass or greater and 10% by mass or less and preferably 0.8% by mass or greater and 5% by mass or less with respect to the total solid content. Further, the content of the charge transport material in the single layer type photosensitive layer may be, for example, 5% by mass or greater and 50% by mass or less with respect to the total solid content.

The method of forming the single layer type photosensitive layer is the same as the method of forming the charge generation layer or the charge transport layer.

The film thickness of the single layer type photosensitive layer may be, for example, 5 μm or greater and 50 μm or less and preferably 10 μm or greater and 40 μm or less.

Rotation Speed of Electrophotographic Photoreceptor

It is preferable that the conductive base material A is, for example, a conductive base material having a roll shape such as a columnar shape or a cylindrical shape.

From the viewpoint that the effects of the present exemplary embodiment are further exhibited, the rotation speed of the electrophotographic photoreceptor in a case of image formation is, for example, preferably 100 mm/s or less and more preferably 10 mm/s or greater and 80 mm/s or less.

It is preferable that the image forming apparatus according to the present exemplary embodiment further includes, for example, a charging device that charges the surface of the electrophotographic photoreceptor by applying the charging device of a contact charging type, in which only a direct current voltage is applied to the charging member, an electrostatic latent image forming device that forms an electrostatic latent image on the charged surface of the electrophotographic photoreceptor, a developing device that develops the electrostatic latent image formed on the surface of the electrophotographic photoreceptor with a developer containing a toner to form a toner image, and a transfer device that transfers the toner image to a surface of a recording medium.

As the image forming apparatus according to the present exemplary embodiment, known image forming apparatuses such as an apparatus including a fixing device that fixes a toner image transferred to the surface of a recording medium; a direct transfer type apparatus that transfers a toner image formed on the surface of an electrophotographic photoreceptor directly to a recording medium; an intermediate transfer type apparatus that primarily transfers a toner image formed on the surface of an electrophotographic photoreceptor to the surface of an intermediate transfer member and secondarily transfers the toner image transferred to the surface of the intermediate transfer member to the surface of a recording medium; an apparatus including a cleaning device that cleans the surface of an electrophotographic photoreceptor after the transfer of a toner image and before the charging; and an apparatus including an electrophotographic photoreceptor heating member for increasing the temperature of an electrophotographic photoreceptor and decreasing the relative temperature are employed.

In a case of the intermediate transfer type apparatus, the transfer device is, for example, configured to include an intermediate transfer member having a surface onto which the toner image is transferred, a primary transfer device primarily transferring the toner image formed on the surface of the electrophotographic photoreceptor to the surface of the intermediate transfer member, and a secondary transfer device secondarily transferring the toner image transferred to the surface of the intermediate transfer member to the surface of the recording medium.

The image forming apparatus according to the present exemplary embodiment may be any of a dry development type image forming apparatus or a wet development type (development type using a liquid developer) image forming apparatus.

Further, in the image forming apparatus according to the present exemplary embodiment, for example, the portion including at least any one of the electrophotographic photoreceptor or the charging member may have a cartridge structure (process cartridge) that is attachable to and detachable from the image forming apparatus. For example, a process cartridge including at least any one of the electrophotographic photoreceptor or the charging member is preferably used as the process cartridge. Further, the process cartridge may include, for example, at least one selected from the group consisting of an electrostatic latent image forming device, a developing device, and a transfer device in addition to the electrophotographic photoreceptor or the charging member.

Hereinafter, an example of the image forming apparatus according to the present exemplary embodiment will be described, but the present exemplary embodiment is not limited thereto. Further, main parts shown in the figures will be described, but description of other parts will not be provided.

First Exemplary Embodiment

Figure 2:
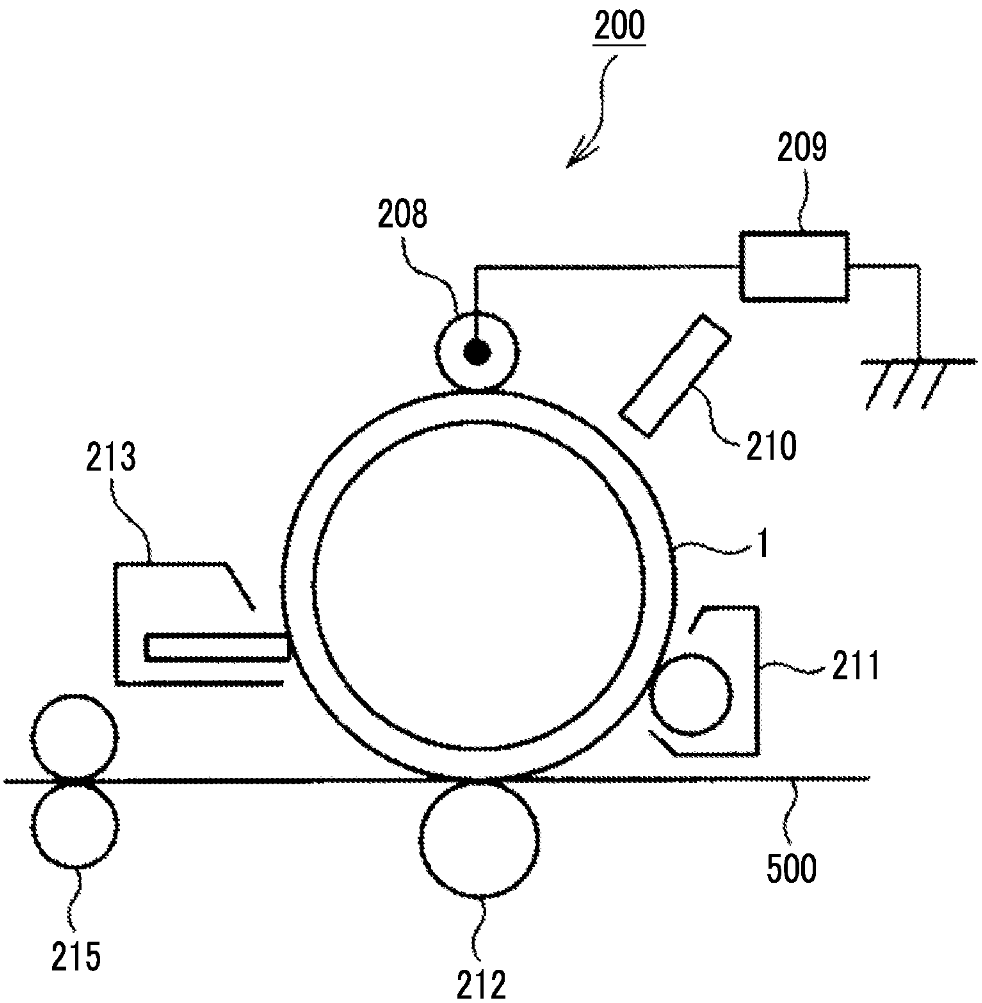
FIG. 2 is a schematic view showing an example of a basic configuration of the image forming apparatus according to the present exemplary embodiment.

FIG. 2 schematically shows a basic configuration of the image forming apparatus of a first exemplary embodiment. An image forming apparatus 200 shown in FIG. 2 includes an electrophotographic photoreceptor 1, a DC contact charging type charging device (charging device) that is connected to a power supply 209 and charges the electrophotographic photoreceptor 1, an exposure device 210 (electrostatic latent image forming device) that exposes the electrophotographic photoreceptor 1 charged by the charging device to form an electrostatic latent image, a developing device 211 (developing device) that develops the electrostatic latent image formed by the exposure device 210 with a developer containing a toner to form a toner image, a transfer device 212 (transfer device) that transfers the toner image formed on the surface of the electrophotographic photoreceptor 1 to a recording medium 500, a toner removing device 213 (toner removing device) that removes the toner remaining on the surface of the electrophotographic photoreceptor 1 after the transfer, and a fixing device 215 (fixing device) that fixes the toner image transferred to the recording medium 500 to the recording medium 500.

The image forming apparatus 200 shown in FIG. 2 is an eraseless type image forming apparatus that does not include a destaticizing device that removes the charge remaining on the surface of the photoreceptor after the toner image on the surface of the photoreceptor is transferred. In general, color streaks are likely to occur in an image in a case where the image forming apparatus does not include a destaticizing device that removes the charge remaining on the surface of the photoreceptor, but the image forming apparatus according to the present exemplary embodiment suppresses occurrence of color streaks even in a case where the image forming apparatus does not include such a destaticizing device.

Electrophotographic Photoreceptor

The electrophotographic photoreceptor 1 is the electrophotographic photoreceptor described above, and examples thereof include a photoreceptor that is formed by laminating an undercoat layer, a charge generation layer, and a charge transport layer on the conductive base material A in this order and includes a function-separated type photosensitive layer in which the charge generation layer and the charge transport layer are provided separately. Further, the electrophotographic photoreceptor may be a function-integrated type electrophotographic photoreceptor including a photosensitive layer in which a charge generation layer and a charge transport layer are integrally formed.

Further, the electrophotographic photoreceptor 1 may not include an undercoat layer, may be provided with an interlayer between an undercoat layer and a photosensitive layer, or may be provided with a protective layer containing a charge transport material on the photosensitive layer.

Further, from the viewpoint of suppressing occurrence of color streaks and extending the life of the electrophotographic photoreceptor 1, the total thickness of the surface layer having charge transport properties is, for example, preferably 24 μm or greater and 50 μm or less and more preferably 28 μm or greater 38 μm or less.

For example, in an image forming apparatus including a DC contact charging type charging device, in a case where a function-separated type photoreceptor including a charge transport layer as an outermost layer is used, as the thickness of the charge transport layer increases, the life of the image forming apparatus increases, but color streaks are likely to occur. Further, even in a case where a second charge transport layer that further suppresses abrasion than a first charge transport layer is provided as a protective layer on the first charge transport layer, as the total thickness of the first charge transport layer and the second charge transport layer (protective layer) increases, the life of the image forming apparatus increases, but color streaks are likely to occur.

Even in a case of the function-integrated type photoreceptor, the total thickness of the surface layer having charge transport properties increases, the life of the image forming apparatus increases, but color streaks are likely to occur.

However, in a case where the above-described charging member is used, occurrence of color streaks is suppressed and the life of the image forming apparatus increases even in a case where the total thickness of the surface layer having charge transport properties in the photoreceptor is 24 μm or greater and 50 μm or less. In the present exemplary embodiment, the total thickness of the surface layer having the charge transport properties in the photoreceptor is the total thickness of the charge transport layer and the protective layer in a case where the protective layer containing a charge transport material is provided on the function-separated type photosensitive layer and the total thickness of the photosensitive layer and the protective layer in a case where the protective layer containing a charge transport material is provided on the function-integrated type photosensitive layer.

Charging Device

The charging device is a DC contact charging type charging device that includes the charging member 208 described above and applies a direct current voltage to charge the surface of the electrophotographic photoreceptor 1. Examples of the voltage to be applied include a positive or negative direct current voltage of 50 V or greater and 2000 V or less, depending on the electric potential of the photoreceptor to be required.

Further, the pressure at which the charging member 208 comes into contact with the electrophotographic photoreceptor 1 is, for example, in a range of 250 mgf or greater and 600 mgf or less.

By bringing the charging member 208 into contact with the surface of the electrophotographic photoreceptor 1, the charging device rotates by following the photoreceptor 1 even in a case where the charging device does not include a driving unit, but the charging device may rotate at a peripheral speed different from the peripheral speed of the electrophotographic photoreceptor 1 by attaching a driving unit to the charging member 208.

Exposure Device

A known exposure unit is used as the exposure device 210. Specific examples thereof include an optical system device that performs exposure using a light source such as a semiconductor laser, a light emitting diode (LED), or a liquid crystal shutter. The amount of light in a case of writing may be, for example, in a range of 0.5 $mJ/m^2$ or greater and 5.0 $mJ/m^2$ or less on the surface of the photoreceptor.

Developing Device

Examples of the developing device 211 include a two-component developing type developing unit that performs development by bringing a developing brush (developer holding member), to which a developer consisting of a carrier and a toner is attached, into contact with the electrophotographic photoreceptor 1, and a contact-type one-component developing type developing unit that attaches a toner onto a conductive rubber elastic body transport roll (developer holding member) to develop the toner on the electrophotographic photoreceptor.

The toner is not particularly limited as long as a known toner is used. Specifically, for example, a toner that contains at least a binder resin and, as necessary, a colorant, a release agent, and the like may be used.

A method of producing the toner is not particularly limited, and examples thereof include toner production methods by known polymerization methods such as a typical pulverization method, and a wet melt spheroidization method, a suspension polymerization method, a dispersion polymerization method, and an emulsion polymerization aggregation method, in which the toner is prepared in a dispersion medium.

In a case where the developer is a two-component developer consisting of a toner and a carrier, the carrier is not particularly limited, and examples thereof include a carrier (non-coated carrier) consisting of only a core material, for example, a magnetic metal such as iron oxide, nickel, or cobalt, or a magnetic oxide such as ferrite or magnetite, and a resin-coated carrier in which a resin layer is provided on the surface of any of these core materials. In the two-component developer, for example, the mixing ratio (mass ratio) of the toner to the carrier (toner:carrier) may be in a range of 1:100 to 30:100 or in a range of 3:100 to 20:100.

Transfer Device

Examples of the transfer device 212 include a contact-type transfer charger using a belt, a film, a rubber blade, or the like, or a scorotron transfer charger or a corotron transfer charger using corona discharge in addition to the roll-shaped contact-type charging member.

Toner Removing Device

The toner removing device 213 is used to remove the remaining toner attached to the surface of the electrophotographic photoreceptor 1 after the transfer step, and the electrophotographic photoreceptor 1 having a surface cleaned by the removal is repeatedly subjected to the image forming process described above. In addition to a foreign matter removing member (cleaning blade), a brush cleaning device, a roll cleaning device, or the like is used as the toner removing device 213. Among these, for example, a cleaning blade is preferably used. Further, examples of the material of the cleaning blade include urethane rubber, neoprene rubber, and silicone rubber.

Further, in a case where the residual toner does not cause a problem, for example, in a case where the toner is unlikely to remain on the surface of the electrophotographic photoreceptor 1, the toner removing device 213 does not need to be provided.

A basic image forming process of the image forming apparatus 200 will be described.

First, the charging device charges the surface of the electrophotographic photoreceptor 1 to a predetermined potential. Next, the charged surface of the electrophotographic photoreceptor 1 is exposed by the exposure device 210 based on an image signal to form an electrostatic latent image.

Next, a developer is held on the developer holding member of the developing device 211, and the held developer is transported to the electrophotographic photoreceptor 1 and supplied to the electrostatic latent image at a position where the developer holding member and the electrophotographic photoreceptor 1 come close to each other (or come into contact with each other). In this manner, the electrostatic latent image is developed to form a toner image.

The developed toner image is transported to a position of the transfer device 212 and directly transferred to the recording medium 500 by the transfer device 212.

Next, the recording medium 500 to which the toner image is transferred is transported to the fixing device 215, and the toner image is fixed to the recording medium 500 by the fixing device 215. The fixing temperature may be, for example, in a range of 100° C. or higher and 180° C. or lower.

Meanwhile, the toner image is transferred to the recording medium 500, and the toner particles remaining on the electrophotographic photoreceptor 1 without being transferred are transported to a contact position with the toner removing device 213 and are recovered by the toner removing device 213.

As described above, the image forming apparatus 200 performs image forming. In a case where the next image formation is performed, the next image forming process is performed without carrying out the step of removing the charge on the surface of the electrophotographic photoreceptor 1.

Second Exemplary Embodiment

Figure 3:
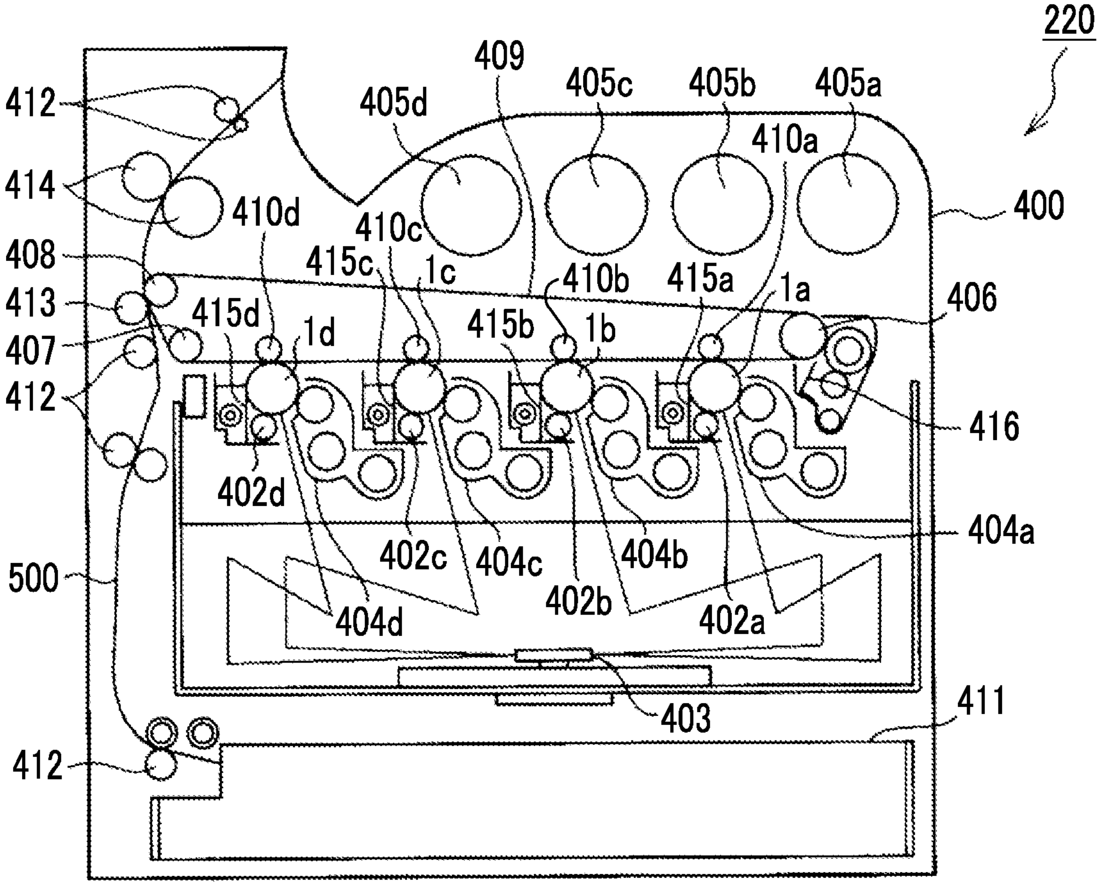
FIG. 3 is a schematic view showing another basic configuration of the image forming apparatus according to the present exemplary embodiment.

FIG. 3 schematically shows a basic configuration of the image forming apparatus of a second exemplary embodiment. An image forming apparatus 220 shown in FIG. 3 is an intermediate transfer type image forming apparatus and formed such that four electrophotographic photoreceptors 1*a*, 1*b*, 1*c*, and 1*d* are disposed in parallel with each other along an intermediate transfer belt 409 in a housing 400. For example, the electrophotographic photoreceptor 1*a* forms a yellow image, the electrophotographic photoreceptor 1*b* forms a magenta image, the electrophotographic photoreceptor 1*c* forms a cyan image, and the electrophotographic photoreceptor 1*d* forms a black image.

The electrophotographic photoreceptors 1*a*, 1*b*, 1*c*, and 1*d* are respectively the electrophotographic photoreceptors described above.

Even the image forming apparatus 220 shown in FIG. 3 is an eraseless type image forming apparatus that does not include a destaticizing unit that removes the charge remaining on the surface of the photoreceptor after the toner image on the surface of the photoreceptor is transferred.

The electrophotographic photoreceptors 1*a*, 1*b*, 1*c*, and 1*d* each rotate in one direction (counterclockwise on the paper surface), and charging members 402*a*, 402*b*, 402*c*, and 402*d*, developing devices 404*a*, 404*b*, 404*c*, and 404*d*, primary transfer rolls 410*a*, 410*b*, 410*c*, and 410*d*, and cleaning blades 415*a*, 415*b*, 415*c*, and 415*d* are disposed in the rotation direction thereof. The charging members 402*a*, 402*b*, 402*c*, and 402*d* are respectively the charging members described above, and a contact charging type charging member that applies only a direct current voltage is employed.

The developing devices 404*a*, 404*b*, 404*c*, and 404*d* supply toners of four colors of black, yellow, magenta, and cyan, respectively accommodated in the toner cartridges 405*a*, 405*b*, 405*c*, and 405*d*, and the primary transfer rolls 410*a*, 410*b*, 410*c*, and 410*d* are respectively in contact with the electrophotographic photoreceptors 1*a*, 1*b*, 1*c*, and 1*d* via the intermediate transfer belt 409.

A laser light source (exposure device) 403 is disposed in the housing 400, and the charged surfaces of the electrophotographic photoreceptors 1*a*, 1*b*, 1*c*, and 1*d* are irradiated with laser light emitted from the laser light source 403.

In this manner, each of the charging step, the exposing step, the developing step, the primary transfer step, and the cleaning step (removal of foreign matter such as the toner) is sequentially performed in the rotating step of the electrophotographic photoreceptors 1*a*, 1*b*, 1*c*, and 1*d*, and the toner image of each color is transferred by being superimposed on the intermediate transfer belt 409. Further, in the electrophotographic photoreceptors 1*a*, 1*b*, 1*c*, and 1*d* after the toner image is transferred onto the intermediate transfer belt 409, the next image forming process is performed without carrying out the step of removing the charge on the surface.

The intermediate transfer belt 409 is supported by a driving roll 406, a back surface roll 408, and a support roll 407 with a tension and rotates without being deflected due to the rotation of these rolls. Further, a secondary transfer roll 413 is disposed to come into contact with the back surface roll 408 via the intermediate transfer belt 409. The intermediate transfer belt 409 that has passed through the position sandwiched between the back surface roll 408 and the secondary transfer roll 413 is surface-cleaned by, for example, a cleaning blade 416 disposed to face the driving roll 406 and is repeatedly subjected to the next image forming process.

Further, a container 411 that accommodates a recording medium is provided in the housing 400, and the recording medium 500 such as paper in the container 411 is sequentially transported to a position sandwiched between the intermediate transfer belt 409 and the secondary transfer roll 413 by a transport roll 412 and to a position sandwiched between two fixing rolls 414 that are in contact with each other and is discharged to the outside of the housing 400.

In the description above, a case where the intermediate transfer belt 409 is used as the intermediate transfer member has been described, but the intermediate transfer member may have a belt shape similarly to the intermediate transfer belt 409 or a drum shape. In a case where the intermediate transfer member has a belt shape, a known resin is used as the resin material constituting the base material of the intermediate transfer member. Example thereof include a polyimide resin, a polycarbonate resin (PC), polyvinylidene fluoride (PVDF), polyalkylene terephthalate (PAT), blended materials such as ethylene tetrafluoroethylene copolymer (ETFE)/PC, ETFE/PAT, and PC/PAT, resin materials such as polyester, polyether ether ketone, and polyamide, and resin materials using these materials as main raw materials. Further, the resin materials and the elastic materials may be blended and used.

Further, the recording medium according to the exemplary embodiment is not particularly limited as long as the medium transfers the toner image formed on the electrophotographic photoreceptor.

Process Cartridge

A process cartridge used in the present exemplary embodiment is configured to be attached to and detached from the image forming apparatus.

Figure 4:
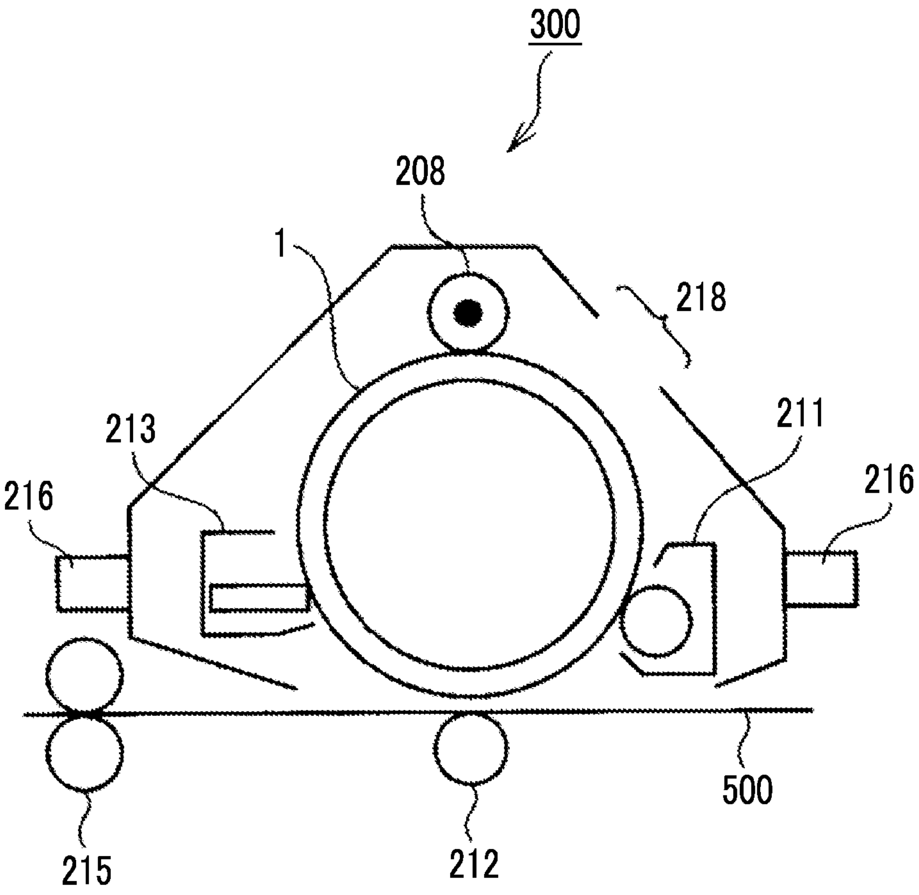
FIG. 4 is a schematic view showing a basic configuration of a process cartridge used in the image forming apparatus according to the present exemplary embodiment.

FIG. 4 schematically shows a basic configuration of an example of the process cartridge according to the present exemplary embodiment. A process cartridge 300 is formed by combining and integrating the developing device 211 that develops an electrostatic latent image formed on the electrophotographic photoreceptor 1 upon exposure with a developer containing a toner to form a toner image, the toner removing device 213 that removes the toner remaining on the surface of the electrophotographic photoreceptor 1 after the transfer, and an opening portion 218 for exposure using a mounting rail 216 in addition to the electrophotographic photoreceptor 1 and the DC contact charging type charging device that applies a direct current voltage to the charging member to charge the surface of the electrophotographic photoreceptor 1.

Further, the process cartridge 300 is configured to be attachable to and detachable from an image forming apparatus main body consisting of the transfer device 212 that transfers a toner image formed on the surface of the electrophotographic photoreceptor 1 to the recording medium 500, the fixing device 215 that fixes the toner image transferred to the recording medium 500 to the recording medium 500, and other constituent components (not shown) and constitutes the image forming apparatus together with the image forming apparatus main body.

The process cartridge 300 may further include an exposure device (not shown) that exposes the surface of the electrophotographic photoreceptor 1, in addition to the electrophotographic photoreceptor 1, the charging device, the developing device 211, the toner removing device 213, and the opening portion 218 for exposure.

EXAMPLES

Hereinafter, the present exemplary embodiment will be described in detail with reference to examples, but the present exemplary embodiment is not limited to these examples.

Example 1

Preparation of Electrophotographic Photoreceptor 1

Formation of Undercoat Layer 60 parts by mass of zinc oxide particles (manufactured by Tayca Corporation, average particle diameter: 70 nm, specific surface area value: 15 $m^2/g$) are mixed with 500 parts by mass of tetrahydrofuran by being stirred, and 1.25 parts by mass of KBM603 (manufactured by Shin-Etsu Chemical Co., Ltd., N-2-(aminoethyl)-3-aminopropyltrimethoxysilane) serving as a silane coupling agent (surface treatment agent) is added to the mixture with respect to 100 parts by mass of the zinc oxide particles, and the mixture is stirred for 2 hours. Thereafter, tetrahydrofuran is distilled off under reduced pressure for removal and baked at 120° C. for 3 hours to obtain zinc oxide particles subjected to a surface treatment with a silane coupling agent.

60 parts by mass of the zinc oxide particles subjected to a surface treatment with the silane coupling agent, 1 part by mass of anthraquinone as an electron-accepting compound, 13.5 parts by mass of blocked isocyanate (SUMIDUR 3173, manufactured by Sumitomo Bayer Urethane Co., Ltd.) as a curing agent, and 15 parts by mass of a butyral resin (S-LEC BM-1, manufactured by Sekisui Chemical Co., Ltd.) are dissolved in 85 parts by mass of methyl ethyl ketone. 38 parts by mass of this solution and 25 parts by mass of methyl ethyl ketone are mixed and dispersed for 4 hours with a sand mill using glass beads having a diameter of 1 mm, thereby obtaining a dispersion liquid. 0.005 part by mass of dioctyltin dilaurate as a catalyst and 4.0 parts by mass of silicone resin particles (TOSPEARL 145, manufactured by GE Toshiba Silicone Co., Ltd.) are added to the obtained dispersion liquid, thereby obtaining a coating solution for forming an undercoat layer.

An aluminum base material (conductive base material A) having a diameter of 30 mm is coated with the coating solution by a dip coating method, and dried and cured at 180° C. for 24 minutes to form an undercoat layer having a thickness of 30 μm.

Formation of Charge Generation Layer

Next, a mixture of 15 parts by mass of chlorogallium phthalocyanine crystals having strong diffraction peaks at Bragg angles (2θ±0.2°) of at least of 7.4°, 16.6°, 25.5°, and 28.3° with respect to Cuka characteristic X-ray, 10 parts by mass of a vinyl chloride-vinyl acetate copolymer resin (VMCH, Nippon Unicar Company Limited), and 300 parts by mass of n-butyl alcohol as charge generation materials is dispersed in a sand mill for 4 hours using glass beads having a diameter of 1 mm, thereby obtaining a coating solution for forming a charge generation layer.

The undercoat layer is immersed in and coated with the coating solution for forming a charge generation layer, and dried to form a charge generation layer having a thickness of 0.2 μm.

Formation of Charge Transport Layer

Next, 8 parts by mass of tetrafluoroethylene resin particles (average particle diameter: 0.2 μm), 0.015 parts by mass of a fluorinated alkyl group-containing methacrylic copolymer (weight-average molecular weight: 30,000), 4 parts by mass of tetrahydrofuran, and 1 part by mass of toluene are mixed and stirred for 48 hours while the liquid temperature is maintained at 20° C., thereby obtaining an ethylene tetrafluoride resin particle suspension A.

Next, 3 parts by mass of N,N'-diphenyl-N,N'-bis(3-methylphenyl)-[1,1']biphenyl-4,4'-diamine, 1 part by mass of a compound (1) represented by the following formula, and 6 parts by mass of a bisphenol Z type polycarbonate resin (viscosity average molecular weight: 40,000) as charge transport materials, and 0.1 parts by mass of 2,6-di-t-butyl-4-methylphenol as an antioxidant are mixed, and the mixture is mixed with and dissolved in 24 parts by mass of tetrahydrofuran and 11 parts by mass of toluene, thereby obtaining a mixed solution B.

The tetrafluoroethylene resin particle suspension A is added to the mixed solution B, and the mixture is stirred and mixed, a dispersion treatment is repeatedly performed 6 times by increasing the pressure to 500 kgf/cm$^2$ using a high-pressure homogenizer (manufactured by Yoshida Kikai Co., Ltd.) equipped with a penetration type chamber having a micro-flow path, fluorine-modified silicone oil (trade name: FL-100, manufactured by Shin-Etsu Chemical Co., Ltd.) is added such that the amount thereof reaches 5 ppm, and the mixture is stirred, thereby obtaining a coating solution for forming a charge transport layer.

The charge generation layer is coated with this coating solution and dried at 140° C. for 25 minutes to form a charge transport layer having a thickness of 20.0 μm, thereby obtaining a target electrophotographic photoreceptor 1.

Vulcanization agent: sulfur (VULNOC R, manufactured by Ouchi Shinko Chemical Industrial Co., Ltd.): 1 part by mass Vulcanization accelerator: zinc oxide: 1.5 parts by mass The mixture having the composition described above is kneaded with an open roll, and a roll-shaped elastic layer having a diameter of 15 mm is formed on a surface of a metal shaft (conductive base material), formed by SUS303 and having a diameter of 8 mm, via an adhesive layer using a press molding machine. Thereafter, a conductive elastic roll A having a diameter of 14 mm is obtained by polishing the elastic layer.

Binder resin: N-methoxymethylated nylon (trade name: F30K, manufactured by Nagase ChemteX Corporation): 100 parts by mass Resin: polyvinyl butyral (trade name: S-LEC BL-1, manufactured by Sekisui Chemical Co., Ltd.): 25 parts by mass Particle A: carbon black (trade name: MONAHRCH 1000, manufactured by Cabot Corporation): 15 parts by mass Particle B: polyamide particles (POLYAMIDE 12, manufactured by Arkema S.A.): 10 parts by mass Additive: dimethylpolysiloxane (BYK-307, manufactured by Altana AG): 1 part by mass A mixture having the above-described composition is diluted with methanol/1-propanol, the surface of the conductive elastic roll A is immersed in and coated with the dispersion liquid obtained by dispersion with a bead mill in an environment of room temperature (24° C.) and a relative humidity of 45%, and heated and dried at 130° C. for 30 minutes, thereby forming a surface layer having a thickness of 10 μm. In this manner, a charging member (charging roll) 1 of Example 1 is obtained.

Compound (1)

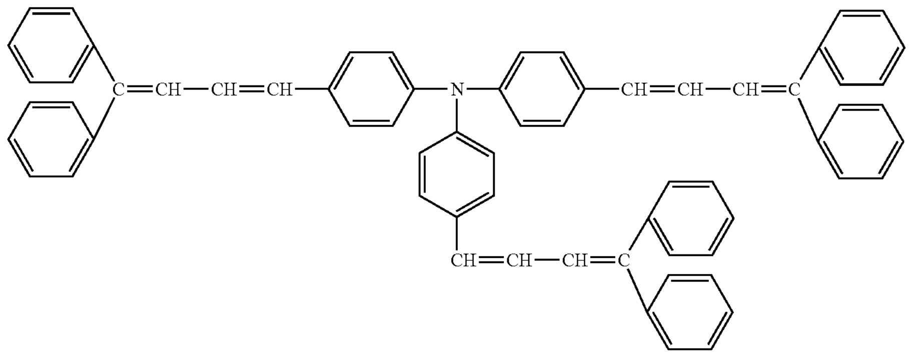

Preparation of Charging Member 1

Formation of Elastic Layer

Epichlorohydrin rubber (Gechron 3106, manufactured by Zeon Corporation): 100 parts by mass Carbon black (Asahi #60, manufactured by Asahi Carbon Co., Ltd.): 6 parts by mass Calcium carbonate (WHITON SB, manufactured by Shiraishi Calcium Kaisha, Ltd.): 20 parts by mass Ionic conductive agent (BTEAC, manufactured by Lion Corporation): 5 parts by mass Vulcanization accelerator: stearic acid (manufactured by NOF Corporation): 1 part by mass Example 2

An electrophotographic photoreceptor 2 is prepared in the same manner as in Example 1 except that the thickness of the charge transport layer is changed to 22.0 μm in the preparation of the electrophotographic photoreceptor 1 of Example 1.

Further, a charging member 2 is prepared in the same manner as in Example 1 except that the thickness of the surface layer is changed to 7 μm in the preparation of the charging member 1 of Example 1.

Example 3

An undercoat layer, a charge generation layer, and a charge transport layer are formed on the conductive base material A in the same manner as in Example 1 except that the tetrafluoroethylene resin particle suspension A is not used in the formation of the charge transport layer, the charge transport layer is formed by the mixed solution B of Example 1, and the thickness of the charge transport layer is changed to 10.0 μm in the preparation of the electrophotographic photoreceptor 1 of Example 1.

Thereafter, 2 parts by mass of NIKALAC BL-60 (methylated benzoguanamine resin, manufactured by Nippon Carbide Industries, Co., Inc.) as the protective layer, 75 parts by mass of a crosslinkable charge transport material containing a reactive hydroxyl group (compound (2) shown below), 23 parts by mass of a crosslinkable charge transport material containing a reactive alkoxyl group (compound (3) shown below), 0.05 parts by mass of block sulfonic acid (trade name: Nacure 5225, manufactured by King Industries, Inc.), 50 parts by mass of 2-butanol, and 100 parts by mass of 2-propanol are mixed to prepare a coating solution for a protective layer. The aluminum base material on which the charge transport layer is formed is coated with the obtained coating solution for a protective layer by a dip coating method, and dried and cured under conditions of 155° C. for 30 minutes to form a protective layer having a thickness of 7 μm, thereby preparing an electrophotographic photoreceptor 3.

In addition, a charging member 3 is prepared in the same manner as in Example 1 except that the environment in the case of coating the surface layer is changed to room temperature (24° C.) and a relative humidity of 35% in the preparation of the charging member 1 of Example 1.

Compound (2)

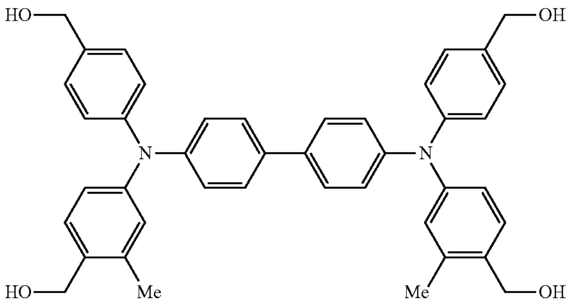

Compound (3)

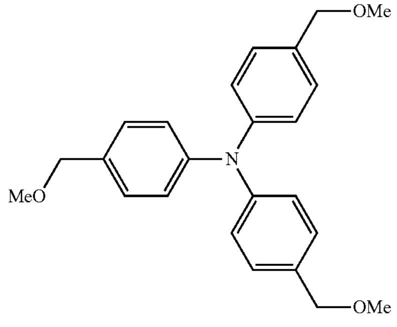

In the chemical formula, Me represents a methyl group.

Example 4

An electrophotographic photoreceptor 4 is prepared in the same manner as in Example 1 except that the thickness of the charge transport layer is changed to 14.0 μm in the preparation of the electrophotographic photoreceptor 3 of Example 3.

Further, a charging member 4 is prepared in the same manner as in Example 1 except that the amount of the polyvinyl butyral is changed to 20 parts by mass in the preparation of the charging member 1 of Example 1.

Example 5

An electrophotographic photoreceptor 5 is prepared in the same manner as in Example 1 except that the thickness of the charge transport layer is changed to 18.0 μm in the preparation of the electrophotographic photoreceptor 3 of Example 3.

In addition, a charging member 5 is prepared in the same manner as in Example 1 except that the environment in the case of coating the surface layer is changed to room temperature (20° C.) and a relative humidity of 55% in the preparation of the charging member 1 of Example 1.

Comparative Example 1

The electrophotographic photoreceptor 1 prepared in Example 1 is used.

In addition, a charging member C1 is prepared in the same manner as in Example 1 except that the environment in the case of coating the surface layer is changed to room temperature (25° C.) and a relative humidity of 30% in the preparation of the charging member 1 of Example 1.

Example 6

The electrophotographic photoreceptor 2 prepared in Example 2 is used.

Further, a charging member 6 is prepared in the same manner as in Example 1 except that the amount of the polyvinyl butyral is changed to 30 parts by mass in the preparation of the charging member 1 of Example 1.

Comparative Example 2

An electrophotographic photoreceptor C3 is prepared in the same manner as in Example 1 except that the thickness of the charge transport layer is changed to 26.0 μm in the preparation of the electrophotographic photoreceptor 1 of Example 1.

Further, a charging member C2 is prepared in the same manner as in Example 1 except that the thickness of the surface layer is changed to 11 μm in the preparation of the charging member 1 of Example 1.

Comparative Example 3

The electrophotographic photoreceptor 3 prepared in Example 3 is used.

Further, a charging member C3 is prepared in the same manner as in Example 1 except that the amount of carbon black used in the surface layer is changed to 11 parts by mass in the preparation of the charging member 1 of Example 1.

Comparative Example 4

The electrophotographic photoreceptor 4 prepared in Example 4 is used.

Further, a charging member C4 is prepared in the same manner as in Example 1 except that the amount of polyvinyl butyral is changed to 10 parts by mass in the preparation of the charging member 1 of Example 1.

Method of Acquiring Dielectric Film Thickness L of Electrophotographic Photoreceptor A capacitance C of the photosensitive layer per unit area in the electrophotographic photoreceptor is represented by the parallel-plate capacitor formula $C=\varepsilon/d$ ($\varepsilon$: dielectric constant and d: film thickness of photosensitive layer).

Dielectric film thickness $L=d/\varepsilon=1/C$

Charge transport layer (CTL) actual film thickness: dCT, protective layer (OCL) actual film thickness: dOC, CTL dielectric constant: εCT, OCL dielectric constant: εOC Therefore, the reciprocal of the combined capacity of the charge transport layer and the protective layer per unit area is "1/C=(dOC/εOC)+(dCT/εCT)=L" (synthetic dielectric film thickness of the charge transport layer and the protective layer) by a method of acquiring the combined capacity of a typical capacitor.

The dielectric film thickness L is acquired by measuring the relationship (Q-V characteristic) between an electric charge (Q(C)) and an electric potential (V(V)) of the electrophotographic photoreceptor per unit area under a condition of a normal temperature and normal humidity environment or a high-temperature and high-humidity environment.

Based on "Capacitor formula: Q=C·V",

"V/Q (Q–V characteristic inclination)=1/C=(dOC/εOC)+(dCT/εCT)=L" is satisfied.

Further, the dielectric film thickness L in the examples and the comparative examples is in units of μm.

Measurement of Resistance Component R by Alternating Current Impedance Method

The resistance component R is measured by using SI 1260 impedance/gain phase analyzer (manufactured by Toyo corporation) as a power supply and an ammeter, and a 1296 dielectric interface (manufactured by Toyo Corporation) as a current amplifier.

A 1Vp-p alternating current voltage is applied from a high frequency side in a frequency range of 500 Hz to 1 Hz using a conductive base material in a sample (charging member) for measuring the impedance as a cathode and a charging member having a surface wound by an aluminum plate with a width of 1.5 cm by one round as an anode, and the resistance component R of the impedance of each sample by an alternating current impedance method is measured under a condition of a normal temperature and normal humidity environment or a high-temperature and high-humidity environment.

Measurement of Surface Roughness Rz

The surface roughness Rz is measured by using a contact-type surface roughness measuring device (SURFCOM 570A, manufactured by Tokyo Seimitsu Co., Ltd.) and a contact needle with a diamond tip (5 μmR, 90° cone) in an environment of a temperature of 23° C. and a relative humidity of 55%. The measurement distance is 2.5 mm, and the measurement site is a site from a position spaced from a terminal of a discharge region by 5 mm to a position spaced by 7.5 mm. The measurement is performed at four sites in 90-degree increments in a circumferential direction of the roll-shaped charging member and at both ends of the discharge region, and an average value of the measured values at a total of eight sites is calculated.

Evaluation of Property of Suppressing Occurrence of Color Streaks

The number of color streaks is measured by incorporating the electrophotographic photoreceptor obtained in each example and each comparative example and the charging member obtained in each example and each comparative example into a modified machine of DocuCentre 505a (manufactured by Fujifilm Business Innovation Corporation) having a contact charging unit in which only a direct current voltage is applied to a charging unit and outputting an A4 size halftone image with an image density of 30% at a rotation speed of 63 mm/s of the electrophotographic photoreceptor under a condition of a normal temperature and normal humidity environment or a high-temperature and high-humidity environment, and the number of color streaks having occurred in a region with a length of 94 mm and a width of 200 mm from the upper left of the print sample is evaluated.

In the present exemplary embodiment, the normal temperature and normal humidity environment denotes an ambient environment at 22° C. and 55% RH (relative humidity), and the high-temperature and high-humidity environment denotes an ambient environment at 28° C. and 85% RH (relative humidity).

The evaluation results are shown in Table 1.

G0: Color streaks are not generated

G1: Color streaks are generated at 1 or more sites and 3 or less sites

G2: Color streaks are generated at 4 or more sites and 10 or less sites

G3: Color streaks are generated at 11 or more sites and 20 or less sites

G4: Color streaks are generated at 21 or more sites

TABLE 1

| | Electrophotographic photoreceptor | | |
|---|---|---|---|
| | Thickness of charge transport layer (μm) | Thickness of protective layer (μm) | Surface roughness Rz of charging member (μm) |
| Example 1 | 20 | 0 | 6.5 |
| Example 2 | 22 | 0 | 6.1 |
| Example 3 | 10 | 7 | 5 |
| Example 4 | 14 | 7 | 5.8 |
| Example 5 | 18 | 7 | 6.6 |
| Example 6 | 22 | 0 | 7.1 |
| Comparative Example 1 | 20 | 0 | 4.3 |
| Comparative Example 2 | 26 | 0 | 6.5 |

TABLE 1-continued

| | | | |
|---|---|---|---|
| Comparative Example 3 | 10 | 7 | 6.3 |
| Comparative Example 4 | 14 | 7 | 3.9 |

| | Normal temperature and normal humidity environment (22° C. and 55% RH) | | | | |
|---|---|---|---|---|---|
| | Dielectric film thickness L of electrophotographic photoreceptor (μm) | Resistance component R of charging member | Value of right side of Expression (1) | Expression (1) | Property of suppressing occurrence of color streaks |
| Example 1 | 6.25 | $2.4 \times 10^5$ | 6.50 | Satisfied | G0 |
| Example 2 | 6.88 | $9.0 \times 10^4$ | 7.23 | Satisfied | G0 |
| Example 3 | 5.17 | $1.3 \times 10^6$ | 5.23 | Satisfied | G0 |
| Example 4 | 6.10 | $3.0 \times 10^5$ | 6.33 | Satisfied | G0 |
| Example 5 | 7.35 | $4.0 \times 10^4$ | 7.84 | Satisfied | G1 |
| Example 6 | 6.88 | $1.0 \times 10^5$ | 7.16 | Satisfied | G1 |
| Comparative Example 1 | 6.25 | $7.6 \times 10^6$ | 3.91 | Not satisfied | G3 |
| Comparative Example 2 | 8.13 | $8.0 \times 10^5$ | 5.60 | Not satisfied | G4 |
| Comparative Example 3 | 5.17 | $4.2 \times 10^6$ | 4.35 | Not satisfied | G3 |
| Comparative Example 4 | 6.10 | $8.2 \times 10^5$ | 5.58 | Not satisfied | G4 |

| | High-temperature and high-humidity environment (28° C. and 85% RH) | | | | |
|---|---|---|---|---|---|
| | Dielectric film thickness L of electrophotographic photoreceptor (μm) | Resistance component R charging member (2) | Value of right side of Expression (1) | Expression (1) | Property of suppressing occurrence of color streaks |
| Example 1 | 6.25 | $1.5 \times 10^5$ | 6.85 | Satisfied | G0 |
| Example 2 | 6.88 | $8.2 \times 10^4$ | 7.30 | Satisfied | G1 |
| Example 3 | 4.96 | $1.7 \times 10^6$ | 5.03 | Satisfied | G0 |
| Example 4 | 5.90 | $2.1 \times 10^5$ | 6.60 | Satisfied | G1 |
| Example 5 | 7.14 | $2.8 \times 10^4$ | 8.11 | Satisfied | G1 |
| Example 6 | 6.88 | $7.0 \times 10^4$ | 7.42 | Satisfied | G1 |
| Comparative Example 1 | 6.25 | $1.7 \times 10^6$ | 5.03 | Not satisfied | G3 |
| Comparative Example 2 | 8.13 | $4.1 \times 10^5$ | 6.10 | Not satisfied | G4 |
| Comparative Example 3 | 4.96 | $2.5 \times 10^6$ | 4.74 | Not satisfied | G3 |
| Comparative Example 4 | 5.90 | $7.5 \times 10^5$ | 5.64 | Not satisfied | G4 |

Based on the evaluation results described above, the image forming apparatuses of the examples are confirmed to suppresses the occurrence of color streaks.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A contact charging type image forming apparatus, to which only a direct current voltage is applied, the apparatus comprising:

an electrophotographic photoreceptor that includes a conductive base material A and a photosensitive layer provided on the conductive base material A; and a charging member that includes a conductive base material B and an elastic layer provided on the conductive base material B, wherein in a case where a dielectric film thickness of the electrophotographic photoreceptor is defined as L, and a resistance component of an impedance of the charging member in a range of 1 Hz or greater and 500 Hz or less, which is measured by an alternating current impedance method, is defined as R, Expression (1) is satisfied, $$L<-0.75\times\log_e(R)+15.79 \quad \text{Expression (1).}$$

2. The image forming apparatus according to claim 1, wherein a rotation speed of the electrophotographic photoreceptor is 100 mm/s or less.

3. The image forming apparatus according to claim 2, wherein the rotation speed of the electrophotographic photoreceptor is 10 mm/s or greater and 80 mm/s or less.

4. The image forming apparatus according to claim 1, wherein the charging member further includes a surface layer on the elastic layer.

5. The image forming apparatus according to claim 1, wherein the dielectric film thickness L is 8.00 μm or less.

6. The image forming apparatus according to claim 5, wherein the dielectric film thickness L is 6.50 μm or less.

7. The image forming apparatus according to claim 1, wherein the resistance component R is $2.0\times10^{4}\Omega$ or greater and $2.0\times10^{6}\Omega$ or less.

8. The image forming apparatus according to claim 7, wherein the resistance component R is $5.0\times10^{5}\Omega$ or greater and $2.0\times10^{6}\Omega$ or less.

9. The image forming apparatus according to claim 1, wherein a surface roughness Rz of the charging member is 4 μm or greater and 7 μm or less.

10. The image forming apparatus according to claim 9, wherein the surface roughness Rz of the charging member is 4.5 μm or greater and 6.5 μm or less.

* * * * *